United States Patent
Yajima et al.

(12)

(10) Patent No.: US 6,824,801 B2
(45) Date of Patent: Nov. 30, 2004

(54) PROCESS FOR PRODUCING FOODS HAVING GOOD KEEPING QUALITIES AND FOOD KEEPING AGENTS

(75) Inventors: Mizuo Yajima, Tokyo (JP); Kazuhiko Nozaki, Tokyo (JP); Kenkou Muroya, Kagoshima (JP); Kazuhiro Yoshinaga, Kagoshima (JP); Mami Fujisue, Kagoshima (JP)

(73) Assignee: Nihon Starch Co., Ltd., Kagoshima (JP)

( * ) Notice: Subject to any disclaimer, the term of this patent is extended or adjusted under 35 U.S.C. 154(b) by 141 days.

(21) Appl. No.: 10/182,668

(22) PCT Filed: Jan. 30, 2001

(86) PCT No.: PCT/JP01/00613

§ 371 (c)(1),
(2), (4) Date: Jul. 31, 2002

(87) PCT Pub. No.: WO01/56408

PCT Pub. Date: Aug. 9, 2001

(65) Prior Publication Data

US 2003/0152676 A1 Aug. 14, 2003

(30) Foreign Application Priority Data

Jan. 31, 2000 (JP) ..................................... 2000-021259
Jan. 31, 2000 (JP) ..................................... 2000-021260
Jan. 31, 2000 (JP) ..................................... 2000-021261
Jan. 31, 2000 (JP) ..................................... 2000-021262

(51) Int. Cl.$^7$ .............................................. A23L 3/34
(52) U.S. Cl. ........................ 426/326; 426/335; 426/321
(58) Field of Search ................. 426/262, 268, 426/310, 321, 326, 335

(56) References Cited

FOREIGN PATENT DOCUMENTS

JP 60-172928 9/1985
JP 04-341169 11/1992
WO WO95/10616 * 4/1995

OTHER PUBLICATIONS

Us Pg Pub 2003/016862.*
Fujisue et al., Journal of Applied Glycoscience, vol. 46, No. 4, pp. 439–444 (1999).
Murata et al., Vitamin, vol. 64, No. 12, pp. 709–713 (1990).
Baute et al., Phytochemistry, vol. 27, No. 11, pp. 3401–3403 (1988).

* cited by examiner

*Primary Examiner*—Carolyn Paden
(74) *Attorney, Agent, or Firm*—Wenderoth, Lind & Ponack LLP

(57) ABSTRACT

The present invention provides a food preservative which contains an antibacterial substance having a high safety and which enhances the preservability of a food without exerting an adverse influence to the taste and flavor of the food; and a method for preserving a food.

The following substances are used alone or in combination for a food additive: 1,5-D-anhydrofructose, and one or two or more of substances having an antibacterial activity and each capable of being used as a food additive such as amino acids such as glycine, alanine and the like; glycerin lower fatty acid esters; sugar esters; salts of vitamin B1; polyphosphates; ethanol; basic proteins and peptides such as protamine or the like; antibacterial extract from licorice; extract from red pepper; extract from hop; extract from yucca; extract from moso bamboo (thick-stemmed bamboo); extract from grape fruit seed; extract from wasabi (Japanese horseradish) or mustard; organic acids such as acetic acid or the like and the salts thereof; sorbic acid, benzoic acid and the salts and esters thereof; propionic acid and the salt thereof; chitosan and bacterium DNA.

7 Claims, 4 Drawing Sheets

F I G. 1
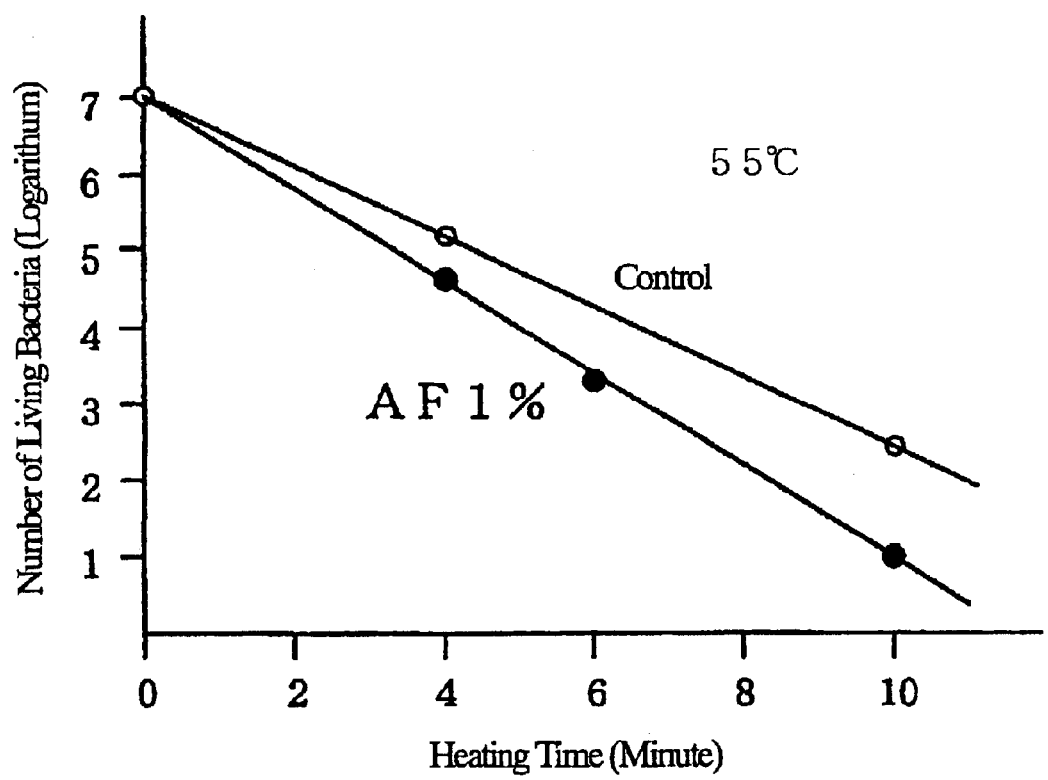

PROCESS FOR PRODUCING FOODS HAVING GOOD KEEPING QUALITIES AND FOOD KEEPING AGENTS

TECHNICAL FIELD

The present invention relates to a process for producing a food having excellent preservability, and a food preservative.

BACKGROUND ART

The storage and preservation of foods in stores and homes in the course of distribution of foods are themes required to be always solved. Various physical and chemical processes have been conceived as measures for such themes. Examples of the measures taken hitherto are freezing, refrigeration, drying, preservation in salt, preservation in sugar, heat sterilization, heat pasteurization (bottling and canning), heating packages, gas substitution of the inside of the packages, and use of a chemical preservative such as benzoic acid, sorbic acid and the like.

The safety is first of all required at all times, but in recent years, particularly, the interest in health and foods is heightened and in addition, the interest in natural foods or foods close to natural foods is growing. Such a tendency to the foods in the recent years exerts a remarkable influence to food-preserving processes.

One problem associated with the current foods is that a national boundary for foods has been eliminated, and that food materials or foods themselves have been imported from all places in all over the world. This means that various microorganisms adhering to or polluting foods have been widely brought to food markets along with the foods, resulting in indication of risks of the food poisoning caused by many new food-poisoning bacteria, e.g., *E. coli* O-157:H7, several salmonellae, and A-type or B-type botulinus bacilli which have been so far less detected in Japan.

Further, a wide variety of cooked foods have increased in recent years. For example, so-called subsidiary foods such as salads, sandwiches, fried eggs, chicken nugget, custard creams, boiled foods, fried foods, pickles or pickled vegetables and the like have been placed on the markets, while being demanded for the assurance of the stability against microorganisms for a given period in its own way.

It is an intention for the health to reduce the concentration of salt in all preservable foods. For example, the concentration equal to or higher than 10% of salt in salted guts of cuttlefish has been reduced to 4 to 5%; the concentration of salt in pickled vegetables in a range of 12 to 13% has been reduced to 4 to 6%; and the concentration of salt in a soybean paste, i.e., miso on the order of 13% has been reduced to 4 to 8%. This means that the stability of the foods against microorganisms has been reduced remarkably. The foods have been liable to be not merely putrefied, but also the safety against various food poisoning bacteria has been reduced.

In such a situation, the basic measures for food-preservation taken usually are as follows, for example: (1) to clean the food producing environment, (2) to reduce the pollution of foods by microorganisms to a level as low as possible at steps of producing and packing the foods, (3) to use food materials having a degree as small as possible of pollution by microorganisms, (4) to control a course from a producing step to a packing step to a temperature as low as possible, and (5) to preserve food products at a low temperature. However, it is extremely difficult to reduce the number of microorganisms in raw food materials completely to zero, and even when foods have been put at a low temperature, some of bacteria proliferate well even at the low temperature and hence, they may grow with the passage of time to putrefy the foods in some cases.

On the other hand, it is a process known from old times to enhance the preservability of foods by heating the foods. However, to carry out the perfect sterilization, a severe heating condition must be set and in such a case, the value of food itself is reduced due to the degradation of nutritious components in the food and to the loss in taste inherent in the food. For this reason, in practice, a heating condition moderate to a certain extent is set and hence, a perfect sterilization cannot be achieved. For example, fabricated foods having increased in recent years suffer from a problem of the deterioration caused by heat-resistant bacteria such as Bacillus remaining in a food after fabrication under heating of the food, and sealed foods such as a canned coffee also suffer from a problem of the deterioration caused by flat-sour spoilage bacteria. Further, a problem of food poisoning due to a secondary pollution arises frequently.

To solve these problems, a variety of techniques for enhancing the preserving food technique have been developed, and the addition of a preservative is one of such techniques. In general, the preservatives are broadly classified into a synthesized preservative designated in the Food Hygiene Law, another food additive having a food preservation effect and a naturally occurring material. However, there is a restriction on use of the synthesized preservative, and some of customers have apprehensions about the safety, particularly, an influence on a human body and hence, there is a tendency in recent years to keep a synthesized preservative from being added. Consequently, the utilization of an antibacterial substance excellent in safety and substituted for the synthesized preservative has been studied.

DISCLOSURE OF THE INVENTION

It is an object of the present invention to provide process for producing a food having excellent preservability, retaining quality by using an antibacterial substance excellent in safety.

It is another object of the present invention to provide a food preservative which contains an antibacterial substance excellent in safety, can enhance the preservability of a wide variety of foods and moreover, does not drop the quality, and to provide a process for preserving foods.

The further objects and advantages of the present invention will become apparent from the following description.

According to the present invention, the above objects and advantages are achieved, first, by a process for producing a food having excellent preservability, which comprises the step of heating a food, while adding 1,5-D-anhydrofructose, or the steps of adding 1,5-D-anhydrofructose to a food and then heating the food (this process may be referred to as a first process of the present invention hereinafter).

According to the present invention, the above objects and advantages are achieved, secondly, by a process for producing a food having excellent preservability, which comprises the step of adding 1,5-D-anhydrofructose previously subjected to a heat treatment to a food (this process may be referred to as a second process of the present invention hereinafter).

According to the present invention, the above objects and advantages are achieved, thirdly, by a food preservative containing (A) one or both of 1,5-D-anhydrofructose and 1,5-D-anhydrofructose previously subjected to a heat treatment, and
(B) a substance capable of being used as a food additive and having an antibacterial activity.

According to the present invention, the above objects and advantages are achieved, fourthly, by a process for producing a food having excellent preservability, which comprises the step of adding the above-described food preservative to a food (this process may be referred to as a third process of the present invention).

According to the present invention, the above objects and advantages are achieved, fifthly, by a method for preserving a food, which comprises adding the above-described food preservative to a food and preserving the obtained food (this process may be referred to as a fourth process of the present invention).

The further objects and advantages of the present invention will become apparent from the following description.

BRIEF DESCRIPTION OF DRAWINGS

FIG. 1 is a curve indicating the number of Pseudomonas aeruginosa IFO 12680 killed by heating.

PRACTICAL EMBODIMENT OF THE INVENMTION 1,5-D-anhydrofructose which is an antibacterial substance used in the present invention can be produced from starch or a decomposition product of starch, as a substrate, by the action of an enzyme, α-1,4-glucan lyase (which will be simply referred to as lyase hereinafter) existing in tissues of a plant such as red alga or in a microorganism such as Basidiomycetes. This 1,5-D-anhydrofructose is a compound having a structure of glucose dehydrated.

Various chemical substances showing an antibacterial effect have been conventionally synthesized and utilized, but 1,5-D-anhydrofructose can be produced from starch which is a polysaccharide, by the action of an enzyme and hence, 1,5-D-anhydrofructose is safe for use in a food. In addition, 1,5-D-anhydrofructose has a proliferation-inhibiting effect broadly against gram-positive bacteria, is also effective in particular against *Bacillus subtillis, Bacillus cereus* and *Lactobacillus casei* and the like, which cause the pollution at a high frequency. *Bacillus subtillis* and *Bacillus cereus* are heat-resistant spore-forming bacteria remaining even after a usual heat treatment of fabricated foods, and *Lactobacillus casei*, too, cause the deterioration of various foods. Antibacterial substances safe and effective for these bacteria are few and hence, 1,5-D-anhydrofructose is of much value as an antibacterial substance having a high safety.

Firstly, the first process of the present invention will be described below.

Though 1,5-D-anhydrofructose has been recognized to exhibit proliferation-inhibiting effect at a concentration of 1% or less against many bacteria, in the first process of the present invention, it is preferable that 1,5-D-anhydrofructose is added in an amount of 0.01 to 10% by weight to a food. When the amount of 1,5-D-anhydrofructose is lower than 0.01% by weight, the antibacterial effect is insufficient, while when the amount exceeds 10% by weight, the resulting food is felt bitter. A more preferable amount of 1,5-D-anhydrofructose added is in a range of 0.1 to 5% by weight.

In the first process of the present invention, the food is heated while adding 1,5-D-anhydrofructose to the food, or after addition of 1,5-D-anhydrofructose to the food. The antibacterial effect of 1,5-D-anhydrofructose is increased by the heating and as compared with a case where the food is not heated, the antibacterial effect is exhibited even in addition of 1,5-D-anhydrofructose at a lower concentration to the food, to make the food added with 1,5-D-anhydrofructose difficult to putrefy. The 1,5-D-anhydrofructose originally has an antibacterial power extremely weak against gram-negative bacteria, but exhibits a strong antibacterial power even against gram-negative bacteria by being heated.

Figure 2:
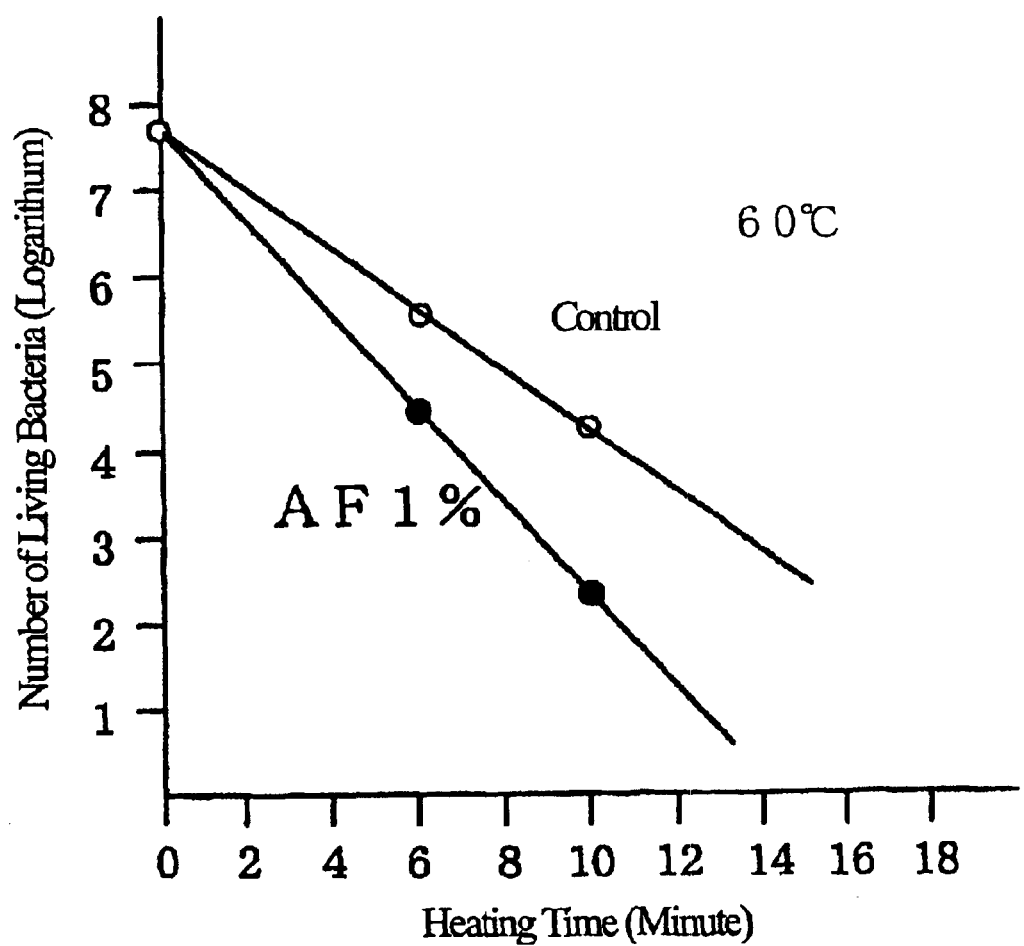
FIG. 2 is a curve indicating the number of which Salmonella typhimurium IFO 12529 killed by heating.

FIGS. 1 and 2 show curves each indicating the number of gram-negative bacteria killed in a soybean-casein digest broth medium (pH of 5.5) by heating. More specifically FIG. 1 shows data concerning Pseudomonas which is typical gram-negative bacteria. FIG. 1 shows that when 1,5-D-anhydrofructose existed in an amount of 1% in the food, the number of bacteria remaining alive as a result of heating of the food at 55° C. for ten minutes was one tenth of that in the control.

FIG. 2 shows data concerning Salmonella bacteria which are typical gram-negative bacteria causing food poisoning of the same gram-negative bacteria, when 1,5-D-anhydrofructose was added in an amount of 1% to the food. FIG. 2 shows that when the food containing 1,5-D-anhydrofructose added thereto was heated at 60° C. for 10 minutes, the number of bacteria remaining alive was one hundredth or less of that in the control.

Figure 3:
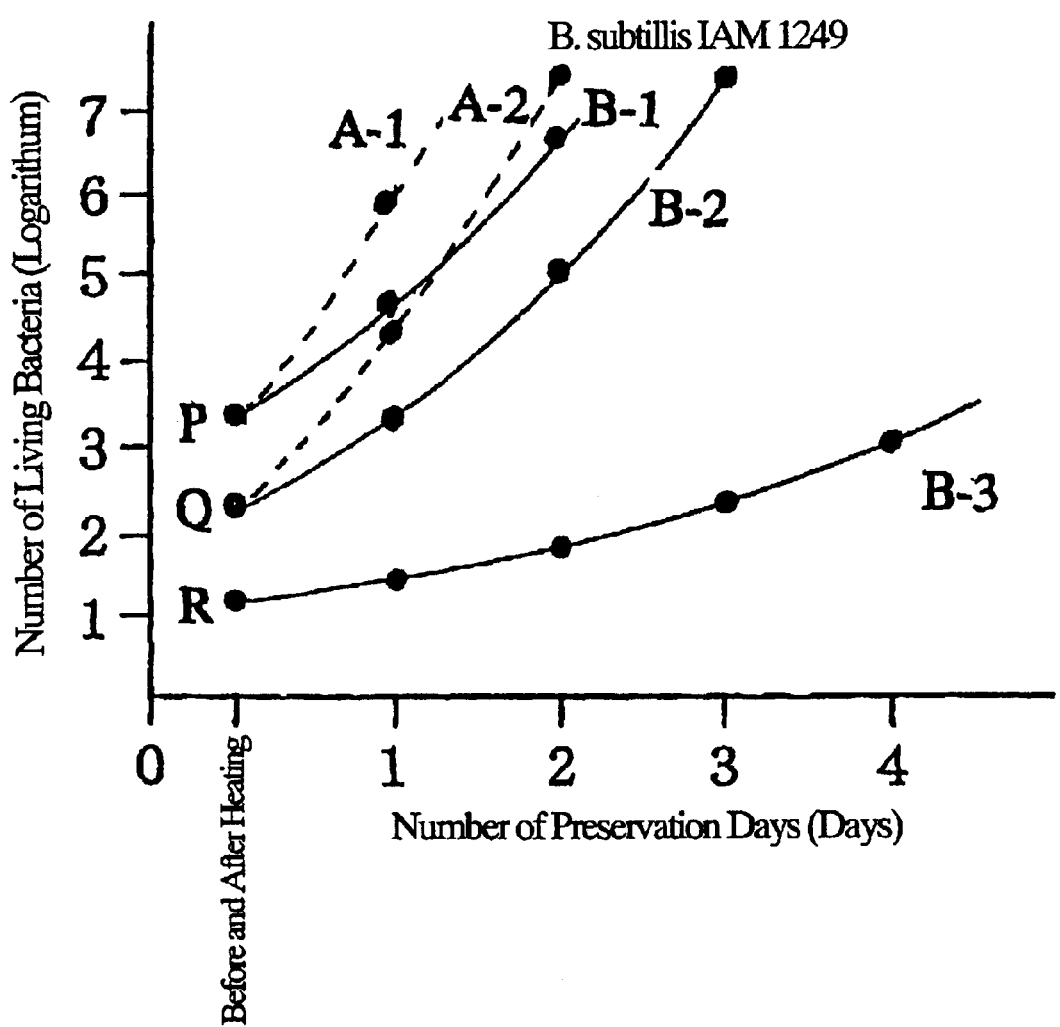
FIG. 3 is a graph showing the number of Bacillus. subtillis IAM 1249 living in a noodle soup under preservation.
Figure 4:
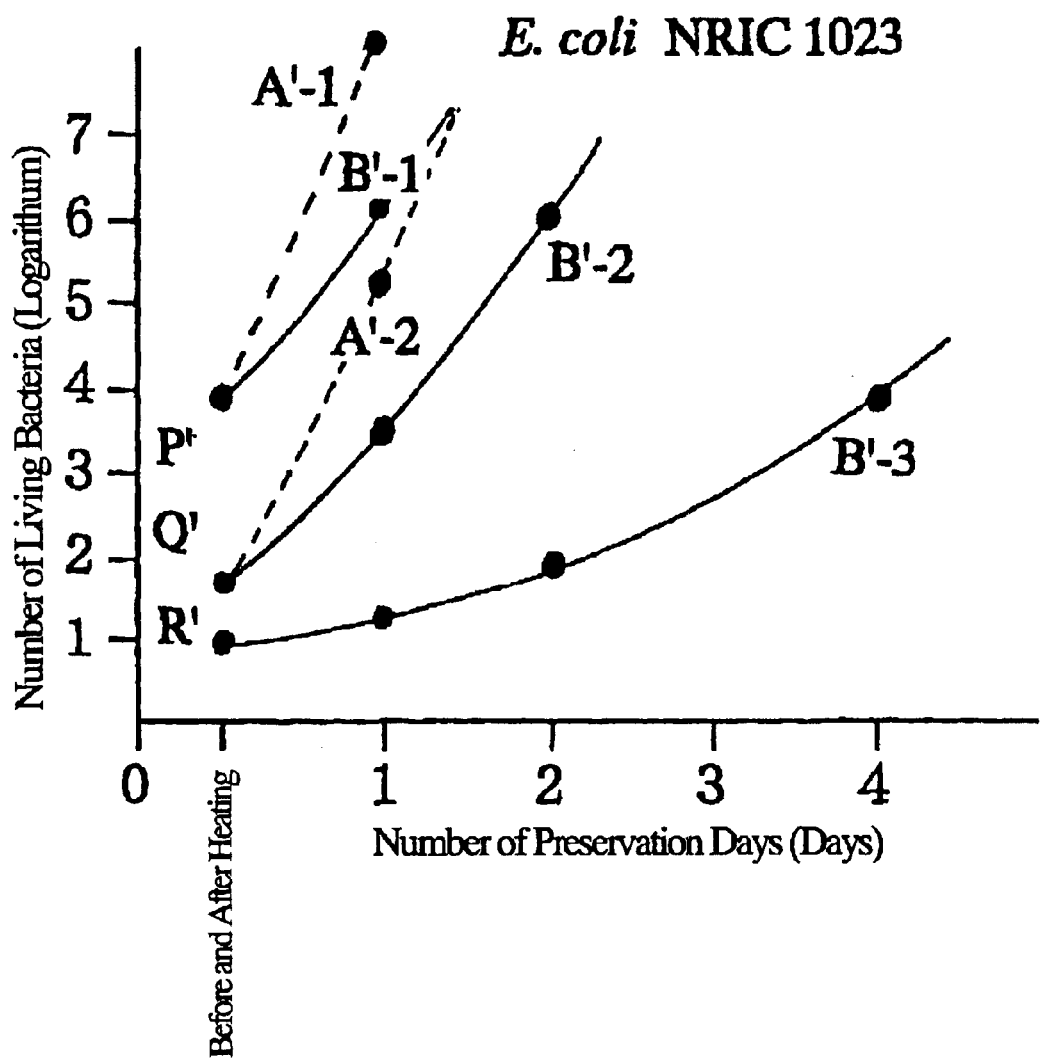
FIG. 4 is a graph showing the number of *Escherichia coli* NRIC 1023 living in a noodle soup under preservation.

As shown in FIGS. 3 and 4, it has been found that when 1,5-D-anhydrofructose is added to a food and the food is then heated, a heat sterilizing effect on both of gram-positive bacteria (*Bacillus subtillis* IAM 1249 in FIG. 3) and gram-negative bacteria (*Escherichia coli* NRIC 1023 in FIG. 4) is promoted and further, the subsequent proliferation of the bacteria is inhibited. This will be described in detail later in Test Example 2.

The term "heating of food" used in the first process of the present invention means the heating of foods for cooking the foods into edible foods by steaming, boiling, roasting, broiling and frying, as well as the heating of foods for sterilization at a high temperature and under a high pressure, for example, for canning, bottling and retort-pouching and further includes the reheating of foods for sterilization after being packaged.

In a food produced through a heating process, the developing of an antibacterial power of 1,5-D-anhydrofructose is extremely high, and the preservability of the food is remarkably enhanced, as compared with the developing of an antibacterial power of 1,5-D-anhydrofructose in a food produced without being subjected to a heating process. Therefore, to effectively exhibit the antibacterial power of 1,5-D-anhydrofructose, the heating process is essential.

The foods to be used in the first process of the present invention are not particularly limited, if they are foods produced through the heating process for cooking, sterilization and the like. For example, they include boiled rice, rice cakes, boiled noodles, breads, bean jams, Japanese-style confections and cakes, flour pastes, aquatic and livestock paste products, fried eggs, custard puddings, noodle soups, bastes, sauces, tea beverages such as canned coffee, canned red tea, canned green tea, water-boiled vegetables, various retort-pouched roux, bottled near-water, fruit drinks, subsidiary foods such as boiled beans, boiled fishes, fried foods, foods boiled down in soy, pickles or pickled vegetables and the like.

In the first process of the present invention, 1,5-D-anhydrofructose is first added to a food. The adding method is not particularly limited, and with a various foods, an optimal adding method can be employed at an optimal adding time before heating of the food. For example, 1,5-D-anhydrofructose may be dissolved in cooking water or the like and added to the food when the food is cooked. To produce noodles or breads, 1,5-D-anhydrofructose may be mixed into a material flour, and the resulting material may be subjected to a treatment for forming a noodle or a bread. Or, a food may be immersed into an aqueous solution of 1,5-D-anhydrofructose, or an aqueous solution of 1,5-D-anhydrofructose may be sprayed onto a food.

Then, when such a food containing 1,5-D-anhydrofructose is then subjected to a heat treatment for cooking or sterilization, a food excellent in preservability is obtained. The appropriate heating conditions vary depending on the type of food, but may be a temperature of 50 to 250° C. and a time of 1 second to 300 minutes. With retort-pouched foods, the preferred conditions vary depending on the type of food, but may be a temperature of about 120 to 130° C. and a time of about 10 to 100 minutes. With canned foods, the preferred conditions may be a temperature of about 110 to 120° C. and a time of about 30 to 300 minutes. With beverages, the preferred conditions may be a temperature of 60° C. and a time of 10 to 30 minutes or a temperature of 90° C. and a time of about 2 minutes for a beverage having a pH value of 4 or less; the preferred conditions may be a temperature of 85° C. and a time of 30 to 60 minutes for a beverage having a pH value of 4 to 4.6; the preferred conditions may be a temperature of 125° C. and a time of 5 to 30 minutes or a temperature of 130 to 150° C. and a time of about 1 to 2 seconds for a beverage having a pH value of 4.6 or more. In the cases of boiled rice, rice cakes, boiled noodles, breads, Japanese-style confections and cakes, flour pastes, aquatic and livestock paste products, fried eggs, custard puddings, noodle soups, bastes, sauces, subsidiary foods such as water-boiled vegetables, boiled beans, boiled fishes, fried foods and the like, and foods boiled down in soy, a sterilizing step at a temperature of about 60 to 90° C. for a time of about 10 to 60 minutes may be carried out in some cases, if required, in addition to the heating in the production of any of these foods.

The second process of the present invention will be described below.

As described in the first process, 1,5-D-anhydrofructose is an antibacterial substance having a high safety, but the present inventors have found to obtain the following advantages when 1,5-D-anhydrofructose is previously subjected to a heat treatment. That is, an antibacterial power of 1,5-D-anhydrofructose can be further increased, and the antibacterial power is developed at a low concentration of 1,5-D-anhydrofructose, as compared with a case where 1,5-D-anhydrofructose is not subjected to the heat treatment. Consequently, a food containing 1,5-D-anhydrofructose is difficult to putrefy and at the same time, the antibacterial spectrum becomes wider. Hence, a proliferation-inhibiting effect is exhibited strongly even against gram-negative bacteria, as observed in a reduction in minimum growth-inhibiting concentration (MIC) shown in Table A.

TABLE A

Influence exerted to minimum growth-inhibiting concentration (MIC) of AF by heat treatment

|  | non-heated AF | heated AF |
| --- | --- | --- |
| Bacillus subtillis IAM 1249 | 3% | 1% |
| Staphylococcus aureus FDA 209P | 1.5% | 0.5% |
| Escherichia coli NRIC 1023 | 5% | 2% |
| Salmonella typhimurium IFO 12529 | 4% | 2% |
| Streptococcus lactis IAM 1249 | 3% | 1% |

(In Table A, AF indicates 1,5-D-anhydrofructose, and heated AF means AF heated at 120° C. for 10 minutes according to a Reference Example 1.)

Heating conditions are preferably a temperature of 50 to 150° C. and a time of 1 second to 100 hours. For example, heat treatment conditions can be selected from temperature of 50° C. under a normal pressure and a time of 10 minutes to 100 hours, a temperature of 95° C. and a time of 1 minute to 10 hours, a temperature of 120° C. under a high pressure and a time of 10 seconds to 2 hours, or a temperature of 130 to 150° C. and a time of 1 second to 30 minutes.

Foods to be used in the second process of the present invention are not particularly limited, and may be either those not required to be heated or those to be heated for cooking or sterilization. Examples of the foods not required to be heated are salads such as potato salad, cut fresh vegetables and fruits, pickles or pickled vegetables, flavorings such as raw soy sauce and miso, salted fish guts, vegetables pickled in sake lees or miso, fresh fishes or fish slices, dried fishes and meats, fresh livestock meats, seeds of green vegetables. Examples of foods to be heated are boiled rice, rice cakes, boiled noodles, steamed noodles, breads, bean jams, aquatic and livestock paste products, noodle soups, sauces, tea beverages such as coffee, red tea and green tea, canned foods such as water-boiled vegetables, various retort-pouched roux, bottled near-water, fruit juice, fruit drinks, subsidiary foods such as boiled beans or boiled fishes, fried foods, and foods boiled down in soy.

To carry out the second process of the present invention, 1,5-D-anhydrofructose heat-treated is first added to a food. A method for adding the heat-treated 1,5-D-anhydrofructose to the food is not particularly limited, and an optimal adding method may be adopted at an optimal adding time depending on the type of food. For example, 1,5-D-anhydrofructose may be added directly to a food to be cooked, or may be dissolved or dispersed in cooking water and then mixed into a food. To produce a noodle or a bread, 1,5-D-anhydrofructose may be mixed into a starting material flour for formation. Further, an aqueous solution of 1,5-D-anhydrofructose may be sprayed to a food, or a food may be immersed into the aqueous solution of 1,5-D-anhydrofructose.

The amount of heat-treated 1,5-D-anhydrofructose added is not particularly limited, but is preferred to be 0.01 to 10% by weight, more preferably 0.1 to 5% by weight from the viewpoints of the developing of an antibacterial power and an influence on the taste of a food.

When the heat-treated 1,5-D-anhydrofructose is added to a starting material for a food or to an uncooked food and food is then cooked or fabricated a food having remarkably excellent preservability can be produced. The heating of a food for cooking and/or sterilization can contribute to an enhancement in preservability of the food, and exerts no adverse influence to the food as well.

The heating of a food can be carried out, while adding previously heated 1,5-D-anhydrofructose to the food, or after addition thereof. The appropriate heating conditions vary depending on the type of food, and for example, may be a temperature of 50 to 250° C. and a time of 1 second to 300 minutes. The preferred heating conditions, for example, for retort-pouched foods vary depending on the type of food, and may be generally a temperature of about 120 to 130° C. and a time of about 10 to 100 minutes; and for canned foods a temperature of about 110 to 120° C. and a time of about 30 to 300 minutes. With beverages, the preferred heating conditions may be a temperature of 60° C. and a time of 10 to 30 minutes or a temperature of 90° C. and a time of about 2 minutes for a beverage having a pH value of 4 or less; a temperature of 85° C. and a time of 30 to 60 minutes for a beverage having a pH value of 4 to 4.6; and a temperature of 125° C. and a time of 5 to 30 minutes or a temperature of 130 to 150° C. and a time of 1 to 2 seconds for a beverage having a pH value of 4.6 or more. In the cases of boiled rice, rice cakes, boiled noodles, breads, Japanese-style confections and cakes, flour pastes, aquatic and livestock paste products, fried eggs, custard puddings, noodle soups, bastes, sauces, water-boiled vegetables, subsidiary foods such as boiled beans, boiled fishes or fried foods, and foods boiled down in soy, a sterilizing step at a temperature of about 60 to 90° C. for a time of about 10 to 60 minutes may be carried out in some cases, if required, in addition to the heating in the production of any of these foods.

The food preservative of the present invention and the third and fourth processes of the present invention will be described below.

The food preservative of the present invention contains (A) one or both of 1,5-D-anhydrofructose and previously heated 1,5-D-anhydrofructose, and
(B) a substance capable of being as a food additive and having an antibacterial activity.

The same components as those described in the first and second processes of the present invention can be used as the component (A).

Examples of the substance (B) having an antibacterial activity and usable as a food additive are amino acids; glycerin lower fatty acid esters; sugar esters; salts of vitamin B1; polyphosphates; ethanol; basic proteins and peptides; antibacterial extract from licorice; extract from red pepper; extract from hop; extract from yucca; extract from moso bamboo (thick-stemmed bamboo); extract from grape fruit seed; extract from wasabi (Japanese horseradish) or mustard; acetic acid, lactic acid, fumaric acid and the salts thereof; sorbic acid, benzoic acid and the salts and esters thereof; propionic acid and the salt thereof; chitosan and bacterium DNA. These substances may be used alone or in combination of two or more. These substances will be described below.

Examples of the amino acids are glycine, cystin, alanine, arginine and lysine. Of these, glycine and alanine are preferred. Such amino acids may be of such a grade that they are allowed to be added to a food.

Examples of glycerin lower fatty acid esters are a monoester and diester of glycerin and a lower fatty acid such as caproic acid, caprylic acid, lauric acid or the like.

As sugar esters, any of esters of sucrose and fatty acids can be used as far as they are permitted as a food additive.

Examples of salts of vitamin B1 are, for example, sulfates such as lauryl sulfate and cetyl sulfate of vitamin B1.

Examples of polyphosphates are sodium pyrophosphate, sodium metaphosphate, and sodium polyphosphate.

Examples of basic proteins and peptides are bacteriocins such as protamine, lysozyme, polylysine and nisin.

The antibacterial extract from licorice, which may be used, is an antibacterial substance produced by using a production process described in JP-A 60-172928, i.e., an antibacterial substance extracted from licorice by an aromatic hydrocarbon, acetone, ethanol and the like. The antibacterial substance of the extract from licorice is substantially unknown at present, but is a substance quite different from glycyrrhizin used as a so-called sweetener.

The extract from red pepper, which may be used, is a substance produced by using a production process described JP-A 4-341169, i.e., a water-soluble fraction extracted from red pepper fruit with an aqueous solvent.

The extract from hop, which may be used, is a substance extracted from ball flower of hop by cold water, hot water or an organic solvent such as an alcohol, an ether, acetone or hexane, or a substance extracted from ball flower of hop by an alkali aqueous solution of sodium hydroxide, potassium hydroxide, sodium carbonate, ammonium carbonate, sodium phosphate and the like.

The extract from yucca, the extract from moso bamboo and the extract from grape fruit seed, which may be used, are commercially available.

As the extract from wasabi (Japanese horseradish) or mustard, an extract containing allyl iso-thiocyanate as a main component may be used.

Examples of salts of acetic acid, lactic acid, fumaric acid, sorbic acid and benzoic acid are sodium salts or potassium salts thereof.

Sorbic acid and benzoic acid and the esters thereof, which may be used, are those commonly used as food additives.

Propionic acid and the salt thereof, which may be utilized, are those commonly used as food additives, and those produced, for example, in a cheese by fermentation may be also utilized.

Examples of chitosan, which may be used, are those which are commercially available for usual foods and which may be in a free state and in the form of any of acetate and glutamate.

DNA extracted from Corynebacterium used by the fermentation of glutamic acid may be used as bacterium DNA, but the bacterium DNA is not limited thereto, and any of DNAs derived from bacteria may be used.

It is presumed that these substances make up for an antibacterial effect against gram-negative bacteria for which 1,5-D-anhydrofructose is not so effective, or cause the impediment of the synthesis of cell walls of bacterium or cause leakage of contents of the cells by bonding to cell membranes of cells of bacterium, or promote the permeation of 1,5-D-anhydrofructose into the cells by giving damages cell membranes by dissolution and the like of cell walls, thereby enhancing the antibacterial action. Such an antibacterial effect is further enhanced by heating the food after addition of these substances to the food.

The substance used in combination with 1,5-D-anhydrofructose is not limited to one type, and the combination of substances of several types is more effective. The several types of the substances may be selected properly in combination depending on the type and composition of a food used, an anticipated pollution—or deterioration—causing microorganism, a pH value, a water activity, and a required preservation temperature and preservation period.

The preferred proportion of the components in the present invention is as follows: For example, the amino acid is used in an amount of 0.01 to 100 parts by weight; the glycerin lower aliphatic ester, the sugar ester and the salt of vitamin B1 are used in an amount of 0.001 to 10 parts by weight, respectively; the polyphosphate is used in an amount of 0.01 to 100 parts by weight; ethanol is used in an amount of 0.01 to 100 parts by weight; the basic protein and peptide are used in an amount of 0.001 to 10 parts by weight; the antibacterial extract from licorice is used in an amount of 0.005 to 50 parts by weight; the extract from red pepper is used in an amount of 0.005 to 50 parts by weight the hop extract is used in an amount of 0.005 to 50 parts by weight; the yucca extract is used in an amount of 0.005 to 50 parts by weight; the moso bamboo extract is used in an amount of 0.005 to 50 parts by weight; the grape fruit seed extract is used in an amount of 0.005 to 50 parts by weight; the wasabi (Japanese horseradish) or mustard extract is used in an amount of 0.000001 to 0.005 parts by weight in terms of ally-isothiocyanate; acetic acid, lactic acid, fumaric acid or the salts thereof is used in an amount of 0.01 to 50 parts by weight; sorbic acid, benzoic acid, propionic acid and the salt or ester thereof are used in an amount of 0.001 to 50 parts by weight; chitosan is used in an amount of 0.01 to 100 parts by weight; and bacterium DNA is used in an amount of 0.01 to 10 parts by weight, all per part by weight of 1,5-D-anhydrofructose.

The food preservative of the present invention has an antibacterial spectrum widened and an antibacterial effect enhanced synergistically, and is excellent and high in safety. In addition, the heating conditions for a food, particularly the heating conditions for sterilization can be moderated by adding the food preservative of the present invention, and as a result, the deterioration of the quality of the food can be prevented. Further, the antibacterial effect can be further enhanced by heating the food for cooking or sterilization after addition of the food preservative to the food.

The process for producing a food having excellent preservability according to the present invention (the third process) is carried out by adding the food preservative of the present invention to, and mixing with, the food. Even if 1,5-D-anhydrofructose and a substance having an antibacterial activity as described above are added separately to a food, a similar effect can be achieved.

In the food preservative of the present invention, 1,5-D-anhydrofructose is added to a food in an amount preferably in a range of 0.01 to 10% by weight, more preferably in a range of 0.1 to 5% by weight based on the entire amount of a food. If the amount of 1,5-D-anhydrofructose added is lower than 0.01% by weight, the antibacterial effect may be insufficient. If the amount exceeds 10% by weight, the food is felt bitter.

In the third process of the present invention, the food can be heated while adding the food preservative or after addition thereof. The antibacterial effect of the food preservative of the present invention is enhanced by heating and the preservability of the food containing thus heat-treated food preservative is enhanced greatly. This is presumed as being attributable to the effect of the heat sterilization and the effect of suppressing or inhibiting the proliferation of the putrefying bacteria during subsequent preservation of the food work synergistically in the presence of the antibacterial substance.

In the third process of the present invention, "heating" means the heating of a food for cooking the food into an edible food by steaming, boiling, roasting, broiling or oil-conditioning, as well as the heating of a food for sterilization at a high temperature and under a high pressure, for example, for canning, bottling and retort-pouching, and further includes the reheating of a food for sterilization after being packaged. The appropriate heating conditions vary depending on the type of food, but may be a temperature of 50 to 250° C. and a time of 1 second to 300 minutes. With retort-pouched foods, the preferred conditions vary depending on the type of food, but may be generally a temperature of about 120 to 130° C. and a time of about 10 to 100 minutes. With canned foods, the preferred conditions may be a temperature of about 110 to 120° C. and a time of about 30 to 300 minutes. With beverages, the preferred conditions may be a temperature of 60° C. and a time of 10 to 30 minutes, or a temperature of 90° C. and a time of about 2 minutes for a beverage having a pH value of 4 or less; the preferred conditions may be a temperature of 85° C. and a time of 30 to 60 minutes for a beverage having a pH value of 4 to 4.6; the preferred conditions may be a temperature of 125° C. and a time of 5 to 30 minutes or a temperature of 130 to 150° C. and a time of about 1 to 2 seconds for a beverage having a pH value of 4.6 or more. In the cases of boiled rice, rice cakes, boiled noodles, breads, Japanese-style confections and cakes, flour pastes, aquatic and livestock paste products, fried eggs, custard puddings, noodle soups, bastes, sauces, water-boiled vegetables, subsidiary foods such as boiled beans, boiled fishes, fried foods and the like, and foods boiled down in soy, a sterilizing step at a temperature of 60 to 90° C. for a time of about 10 to 60 minutes may be carried out in some cases, if required, in addition to the heating in the production of any of these foods.

The fourth process of the present invention can be carried out by preserving the food produced in the third process of the present invention. The food produced in the third process of the present invention has an excellent preservability and hence, the fourth process provides a process excellent as a food preserving process.

EXAMPLES

The present invention will be described in further detail by way of Examples, but is not limited to Examples which will be described below. In the Examples, "part" and "%" are by weight. The number of living bacteria was measured at 300° C. for 48 hours in a standard agar culture medium, and the number of molds and yeast fungi was measured at 30° C. for 72 hours in a potato dextrose agar culture medium.

Reference Example 1 (Preparation of 1,5-D-anhydrofructose)

Lyase used was a specimen produced extracted from a red alga (*Gracilaria verrucosa*) and purified a single band by SDS-PAGE. A debranching enzyme was added to an aqueous solution of maltodextrin having a DE value of about 20 (containing 30% of solids), and they were reacted at 60° C. for 4 hours. Then, the reaction solution was cooled to 40° C. and thereafter, lyase was added thereto so as to secure 15 U/gram of starch, and the incubation was conducted for 25 hours. After completion of the enzyme reaction, the reaction solution was treated with activated carbon to adsorb a colored matter, and an insoluble matter was removed by filteration to produce a sample. The obtained sample contained 30% of solids, and the sugar composition thereof was quantitatively measured by HPLC. The result showed that 72% was 1,5-D-anhydrofructose; 18% was glucose; and 10% was high molecular maltodextrin. The sample was used as 1,5-D-anhydrofructose (which will be abbreviated as AF hereinafter, and the amount of AF added is shown in terms of solids, unless otherwise indicated) in Examples and Test Examples which will be described hereinafter.

In the Examples, the hop extract, chitosan, bacterium DNA, licorice extract, protamine and red pepper extract were manufactured by Asama Kasei, Co.; the polylysine was produced by Chisso, Corp.; the lysozyme was produced by Wako Pure Chemical Ind., Ltd.; the moso bamboo extract was produced by NOF Corp.; the grape fruit seed extract was produced by Biochem.Co., Ltd., the yucca extract was produced by Maruzen Kasei, Co.; and the nisin was a 10% dilute solution produced by Aplin&Barrett.Inc. The other substances used were standardized products specified as food additives.

Example 1

A salt-preserved Japanese radish (pickled radish called "takuan") was desalted under running water, until the salt content reached 3%. The resulting radish was immersed in a flavoring solution prescribed as shown in Table 1 in a refrigerator for 3 days. Then, a preservative shown in Table 2 was added at a concentration four times that shown in Table 2 to the flavoring solution shown in Table 1, and 300 grams of the pickled radish was added to 100 ml of the resulting solution and sacked (the concentration of the preservative was a value shown in Table 2). Various test product groups were prepared in a similar process and preserved at 20° C., and the number of days of preservation was examined by observing the turbidity of the pickled radish liquid, the swelling of the sack and the like. Results are shown in Table 2.

TABLE 1

| Component | Concentration (% by weight) |
|---|---|
| Soy sauce | 1.0 |
| Salt | 3.0 |
| Vinegar | 0.5 |
| Glycyrrhizine | 0.02 |
| Sweet sake | 0.5 |
| Yeast extract | 0.5 |
| HAP | 1.0 |
| Water | 93.48 |

(pH 4.8)

Example 2

Various preservative components shown in Table 3 were added in the proportions shown in Table 3 to a basic composition of a hamburger prepared by blending 1,000 g of beef and pork ground together, 300 g of onion, 60 g of wheat flour and 50 g of water, and the pH of the resulting material was adjusted to 5.8 by hydrochloric acid or caustic soda. Then, hamburgers each weighing 30 grams were formed from the above material and steamed for 25 minutes and cooled. The five pieces of thus produced hamburgers per test division were prepared, and preserved at 25° C. and subjected to a preservation test by checking their appearances and smells. Each of test results is shown in Table 3 by an average value of preservation days for the five hamburgers.

When the preservative of the present invention was added, no adverse influence to the quality due to the addition was observed.

TABLE 2

| Test No. | | AF (%) | Et. (%) | H.E (%) | L.S of V (%) | Ch. (%) | B.DNA (%) | LEX (%) | S.C (%) | Num. of Pre.Ds |
|---|---|---|---|---|---|---|---|---|---|---|
| 1 | Pro. of Co. | 3 | — | — | — | — | — | — | — | 3 |
| 2 | Pro. of Co. | — | 3.0 | — | — | — | — | — | — | 3 |
| 3 | Pro. of Co. | — | — | 0.05 | — | — | — | — | — | 3 |
| 4 | Pro. of Co. | — | — | — | 0.01 | — | — | — | — | 4 |
| 5 | Pro. of Co. | — | — | — | — | 0.2 | — | — | — | 3 |
| 6 | Pro. of Co. | — | — | — | — | — | 0.1 | — | — | 4 |
| 7 | Pro. of Co. | — | — | — | — | — | — | 0.2 | — | 3 |
| 8 | Pro. of Co. | — | — | — | — | — | — | — | 0.05 | 4 |
| 9 | Pro. of In. | 3 | 3.0 | — | — | — | — | — | — | 10 |
| 10 | Pro. of In. | 3 | — | 0.05 | — | — | — | — | — | 10 |
| 11 | Pro. of In. | 3 | — | — | 0.01 | — | — | — | — | 12 |
| 12 | Pro. of In. | 3 | — | — | — | 0.2 | — | — | — | 10 |
| 13 | Pro. of In. | 3 | — | — | — | — | 0.1 | — | — | 10 |
| 14 | Pro. of In. | 3 | — | — | — | — | — | 0.2 | — | 11 |
| 15 | Pro. of In. | 3 | — | — | — | — | — | — | 0.05 | 11 |
| 16 | Pro. of In. | 3 | 3.0 | 0.05 | — | — | — | — | — | 20 |
| 17 | Pro. of In. | 3 | 3.0 | — | 0.01 | — | — | — | — | 22 |
| 18 | Pro. of In. | 3 | 3.0 | — | — | 0.2 | — | — | — | 20 |
| 19 | Pro. of In. | 3 | 3.0 | — | — | — | 0.1 | — | — | 23 |
| 20 | Pro. of In. | 3 | 3.0 | — | — | — | — | 0.2 | — | 19 |
| 21 | Pro. of In. | 3 | 3.0 | — | — | — | — | — | 0.05 | 21 |
| 22 | Pro. of In. | 3 | — | 0.05 | 0.01 | — | — | — | — | 22 |
| 23 | Pro. of In. | 3 | — | 0.05 | — | 0.2 | — | — | — | 20 |
| 24 | Pro. of In. | 3 | — | 0.05 | — | — | 0.1 | — | — | 23 |
| 25 | Pro. of In. | 3 | — | 0.05 | — | — | — | 0.2 | — | 20 |
| 26 | Pro. of In. | 3 | — | 0.05 | — | — | — | — | 0.05 | 22 |
| 27 | Pro. of In. | 3 | — | — | 0.01 | 0.2 | — | — | — | 23 |
| 28 | Pro. of In. | 3 | — | — | 0.01 | — | 0.1 | — | — | 27 |
| 29 | Pro. of In. | 3 | — | — | 0.01 | — | — | 0.2 | — | 24 |
| 30 | Pro. of In. | 3 | — | — | 0.01 | — | — | — | 0.05 | 25 |
| 31 | Pro. of In. | 3 | — | — | — | 0.2 | 0.1 | — | — | 22 |
| 32 | Pro. of In. | 3 | — | — | — | 0.2 | — | 0.2 | — | 22 |
| 33 | Pro. of In. | 3 | — | — | — | 0.2 | — | — | 0.05 | 22 |
| 34 | Pro. of In. | 3 | — | — | — | — | 0.1 | 0.2 | — | 22 |
| 35 | Pro. of In. | 3 | — | — | — | — | 0.1 | — | 0.05 | 23 |
| 36 | Pro. of In. | 3 | — | — | — | — | — | 0.2 | 0.05 | 21 |

Et. = ethanol;
H.E = hop extract;
L.S of V = lauryl sulfate of vitamin B1;
Ch. = chitosan;
B. DNA = bacterium DNA;
LEX = licorice extract;
S.C = sorboic acid;
Num. of Pre.Ds = number of preservation days;
Pro. of Co. = Product of control;
and Pro. of In. = Product of the present invention

TABLE 3

| Test No. | | AF(%) | S.A.(%) | S.L.(%) | S.F.(%) | P.EX.(%) | Pr.(%) | S.ML.(%) | Num. of Pre.Ds |
|---|---|---|---|---|---|---|---|---|---|
| 1 | Pro. of Co. | 2 | — | — | — | — | — | — | 3.8 |
| 2 | Pro. of Co. | — | 0.5 | — | — | — | — | — | 3.8 |
| 3 | Pro. of Co. | — | — | 0.5 | — | — | — | — | 3.6 |
| 4 | Pro. of Co. | — | — | — | 0.5 | — | — | — | 4.4 |
| 5 | Pro. of Co. | — | — | — | — | 0.5 | — | — | 3.2 |
| 6 | Pro. of Co. | — | — | — | — | — | 0.03 | — | 3.6 |
| 7 | Pro. of Co. | — | — | — | — | — | — | 0.1 | 3.2 |
| 8 | Pro. of In. | 2 | 0.5 | — | — | — | — | — | 10.5 |
| 9 | Pro. of In. | 2 | — | 0.5 | — | — | — | — | 10.0 |
| 10 | Pro. of In. | 2 | — | — | 0.5 | — | — | — | 13.2 |
| 11 | Pro. of In. | 2 | — | — | — | 0.5 | — | — | 10.9 |
| 12 | Pro. of In. | 2 | — | — | — | — | 0.03 | — | 12.5 |
| 13 | Pro. of In. | 2 | — | — | — | — | — | 0.1 | 10.3 |
| 14 | Pro. of In. | 2 | 0.5 | 0.5 | — | — | — | — | 23.3 |
| 15 | Pro. of In. | 2 | 0.5 | — | 0.5 | — | — | — | 24.6 |
| 16 | Pro. of In. | 2 | 0.5 | — | — | 0.5 | — | — | 21.1 |
| 17 | Pro. of In. | 2 | 0.5 | — | — | — | 0.03 | — | 23.7 |
| 18 | Pro. of In. | 2 | 0.5 | — | — | — | — | 0.1 | 22.4 |
| 19 | Pro. of In. | 2 | — | 0.5 | 0.5 | — | — | — | 25.3 |
| 20 | Pro. of In. | 2 | — | 0.5 | — | 0.5 | — | — | 21.1 |
| 21 | Pro. of In. | 2 | — | 0.5 | — | — | 0.03 | — | 23.8 |
| 22 | Pro. of In. | 2 | — | 0.5 | — | — | — | 0.1 | 20.0 |
| 23 | Pro. of In. | 2 | — | — | 0.5 | 0.5 | — | — | 23.7 |
| 24 | Pro. of In. | 2 | — | — | 0.5 | — | 0.03 | — | 31.4 |
| 25 | Pro. of In. | 2 | — | — | 0.5 | — | — | 0.1 | 20.2 |
| 26 | Pro. of In. | 2 | — | — | — | 0.5 | 0.03 | — | 22.9 |
| 27 | Pro. of In. | 2 | — | — | — | 0.5 | — | 0.1 | 21.1 |
| 28 | Pro. of In. | 2 | — | — | — | — | 0.03 | 0.1 | 23.3 |

S.A. = sodium acetate;
S.L. = sodium lactate;
S.F. = sodium fumarate;
P.EX. = red pepper extract;
Pr. = protamine;
S.ML. = sucrose monolaurate
Num. of Pre.Ds = number of preservation days
Pro. of Co. = Product of control;
Pro. of In. = Product of the present invention Example 3

Various preservative components shown in Table 4 were added in the proportions shown in Table 4 to a basic composition of a custard cream produced by blending 160 g of a yoke, 1,440 g of milk, 65 g of wheat flour, 65 g of starch and 600 g of sucrose, and the mixtures were boiled at a temperature of 85 to 95° C. for about 10 minutes and cooled. The resulting custard creams were divided into five plastic vessels per test division, and the vessels were lidded softly and the custard creams were preserved at 15° C. for a preservation test in which their appearances and smells were checked. The test results are shown in Table 4 by an average number of preservation days for the five custard creams.

TABLE 4

| Test No. | | AF(%) | Gl.(%) | P.L.(%) | G.C.(%) | S.P.(%) | Ly.(%) | Num. of Pre.Ds |
|---|---|---|---|---|---|---|---|---|
| 1 | Pro. of Co. | 0.75 | — | — | — | — | — | 3.0 |
| 2 | Pro. of Co. | — | 0.5 | — | — | — | — | 2.7 |
| 3 | Pro. of Co. | — | — | 0.02 | — | — | — | 3.0 |
| 4 | Pro. of Co. | — | — | — | 0.04 | — | — | 3.3 |
| 5 | Pro. of Co. | — | — | — | — | 0.1 | — | 2.1 |
| 6 | Pro. of Co. | — | — | — | — | — | 0.03 | 2.8 |
| 7 | Pro. of In. | 0.75 | 0.5 | — | — | — | — | 8.0 |
| 8 | Pro. of In. | 0.75 | — | 0.02 | — | — | — | 8.9 |
| 9 | Pro. of In. | 0.75 | — | — | 0.04 | — | — | 9.0 |
| 10 | Pro. of In. | 0.75 | — | — | — | 0.1 | — | 9.1 |
| 11 | Pro. of In. | 0.75 | — | — | — | — | 0.03 | 9.6 |
| 12 | Pro. of In. | 0.75 | 0.5 | 0.02 | — | — | — | 20.1 |
| 13 | Pro. of In. | 0.75 | 0.5 | — | 0.04 | — | — | 22.3 |
| 14 | Pro. of In. | 0.75 | 0.5 | — | — | 0.1 | — | 20.6 |
| 15 | Pro. of In. | 0.75 | 0.5 | — | — | — | 0.03 | 23.7 |
| 16 | Pro. of In. | 0.75 | — | 0.02 | 0.04 | — | — | 22.6 |
| 17 | Pro. of In. | 0.75 | — | 0.02 | — | 0.1 | — | 21.5 |
| 18 | Pro. of In. | 0.75 | — | 0.02 | — | — | 0.03 | 27.4 |
| 19 | Pro. of In. | 0.75 | — | — | 0.04 | 0.1 | — | 20.2 |

TABLE 4-continued

| Test No. | | AF(%) | Gl.(%) | P.L.(%) | G.C.(%) | S.P.(%) | Ly.(%) | Num. of Pre.Ds |
|---|---|---|---|---|---|---|---|---|
| 20 | Pro. of In. | 0.75 | — | — | 0.04 | — | 0.03 | 22.7 |
| 21 | Pro. of In. | 0.75 | — | — | — | 0.1 | 0.03 | 22.9 |

Gl. = glysine;
P.L. = polylysine;
G.C. = caprylic monoglyceride;
S.P. = sodium polyphosphate;
Ly. = lysozyme;
Num. of Pre.Ds = number of preservation days;
Pro. of Co. = Product of control;
Pro. of In. = Product of the present invention

Example 4

Various preservative components shown in Table 5 were added in the proportions shown in Table 5 to a basic composition produced by blending 500 g of an extra-strength flour, 160 ml of water and 5 g of a brine powder. The mixture was mixed sufficiently and placed into a small-sized noodle-making machine to form noodle strands. The noodle strands were boiled in boiling water for 4 minutes and then cooled. The boiled noodles were drained and then put into polyethylene sacks, which were then sealed. Ten sacks per test division were preserved in a constant-temperature vessel at 25° C., and change in their appearance was observed. The test samples in the ten sacks were evaluated by examining the number of days taken till the occurrence of the discoloration and the softening or the generation of slime and mold at one point on the test samples and taking an average value of the numbers of days as an effective number of preservation days. Results are shown in Table 5.

TABLE 5

| Test No. | | AF (%) | Ly. (%) | Pr. (%) | Gl. (%) | Al. (%) | Num. of Pre.Ds |
|---|---|---|---|---|---|---|---|
| | Non-added | — | — | — | — | — | 2.2 |
| 1 | Pro. of Co. | 3 | — | — | — | — | 3.5 |
| 2 | Pro. of Co. | — | 0.05 | — | — | — | 2.5 |
| 3 | Pro. of Co. | — | — | 0.05 | — | — | 3.4 |
| 4 | Pro. of Co. | — | — | — | 0.5 | — | 2.6 |
| 5 | Pro. of Co. | — | — | — | — | 1 | 3.5 |
| 6 | Pro. of In. | 3 | 0.05 | — | — | — | 8.0 |
| 7 | Pro. of In. | 3 | — | 0.05 | — | — | 9.5 |
| 8 | Pro. of In. | 3 | — | — | 0.5 | — | 8.1 |
| 9 | Pro. of In. | 3 | — | — | — | 1 | 7.9 |// 
| 10 | Pro. of In. | 3 | 0.05 | — | 0.5 | — | 11.4 |
| 11 | Pro. of In. | 3 | — | 0.05 | 0.5 | — | 14.1 |

Ly. = lysozyme;
Pr. = protamine;
Gl. = glysine;
Al. = Alanine;
Num. of Pre.Ds = number of preservation days;
Pro. of Co. = Product of control;
Pro. of In. = Product of the present invention

Example 5

A commercially available and unsealed quadruply concentrated noodle soup was diluted four times with sterile water. In this case, AF was previously added so as to be 1.5%. Thirty 200 ml volume Erlenmeyer flasks with a stopper each containing such noodle soup in an amount of 100 ml were prepared. As shown in Table 6, chemicals were added to each of test sample Nos. 1 to 36. Then, the test sample Nos. 1 to 18 were not heated (remained unheated and unsterilized), and the test sample Nos. 19 to 36 were heated for 10 minutes, i.e., sterilized by hot water. When the test sample Nos. 19 to 36 were cooled, a lactobacillus-mixed solution separated from the deteriorated noodle soup was inoculated in an amount of 0.01 ml into each of the test sample Nos. 1 to 36. The flasks of the test sample Nos. 1 to 36 were placed into an incubator having a temperature of 30° C. for a preservation test. The preservation test was conducted by checking the turbidity of the noodle soup solution as the guideline. Results are as shown in Table 6.

TABLE 6

| Test No. | | AF(%) | SA(%) | BE(%) | GFE(%) | YE(%) | N(%) | BA(%) | Nnm. of Pre.Ds |
|---|---|---|---|---|---|---|---|---|---|
| Unsterilized | 1 Pro. of Co. | 1.5 | — | — | — | — | — | — | 2 |
| | 2 Pro. of Co. | — | 0.5 | — | — | — | — | — | 2 |
| | 3 Pro. of Co. | — | — | 0.2 | — | — | — | — | 3 |
| | 4 Pro. of Co. | — | — | — | 0.1 | — | — | — | 2 |
| | 5 Pro. of Co. | — | — | — | — | 0.05 | — | — | 2 |
| | 6 Pro. of Co. | — | — | — | — | — | 0.02 | — | 4 |
| | 7 Pro. of Co. | — | — | — | — | — | — | 0.05 | 5 |
| | 8 Pro. of In. | 1.5 | 0.5 | — | — | — | — | — | 6 |
| | 9 Pro. of In. | 1.5 | — | 0.2 | — | — | — | — | 8 |
| | 10 Pro. of In. | 1.5 | — | — | 0.1 | — | — | — | 6 |
| | 11 Pro. of In. | 1.5 | — | — | — | 0.05 | — | — | 6 |
| | 12 Pro. of In. | 1.5 | — | — | — | — | 0.02 | — | 10 |
| | 13 Pro. of In. | 1.5 | — | — | — | — | — | 0.05 | 12 |
| | 14 Pro. of In. | 1.5 | 0.5 | 0.2 | — | — | — | — | 14 |

TABLE 6-continued

| Test No. | | AF(%) | SA(%) | BE(%) | GFE(%) | YE(%) | N(%) | BA(%) | Nnm. of Pre.Ds |
|---|---|---|---|---|---|---|---|---|---|
| 15 | Pro. of In. | 1.5 | 0.5 | — | 0.1 | — | — | — | 14 |
| 16 | Pro. of In. | 1.5 | 0.5 | — | — | 0.05 | — | — | 13 |
| 17 | Pro. of In. | 1.5 | 0.5 | — | — | — | 0.02 | — | 18 |
| 18 | Pro. of In. | 1.5 | 0.5 | — | — | — | — | 0.05 | 20 |
| 19 | Pro. of Co. | 1.5 | — | — | — | — | — | — | 4 |
| 20 | Pro. of Co. | — | 0.5 | — | — | — | — | — | 2 |
| 21 | Pro. of Co. | — | — | 0.2 | — | — | — | — | 3 |
| 22 | Pro. of Co. | — | — | — | 0.1 | — | — | — | 2 |
| 23 | Pro. of Co. | — | — | — | — | 0.05 | — | — | 2 |
| 24 | Pro. of Co. | — | — | — | — | — | 0.02 | — | 4 |
| 25 | Pro. of Co. | — | — | — | — | — | — | 0.05 | 6 |
| 26 | Pro. of In. | 1.5 | 0.5 | — | — | — | — | — | 10 |
| 27 | Pro. of In. | 1.5 | — | 0.2 | — | — | — | — | 12 |
| 28 | Pro. of In. | 1.5 | — | — | 0.1 | — | — | — | 10 |
| 29 | Pro. of In. | 1.5 | — | — | — | 0.05 | — | — | 10 |
| 30 | Pro. of In. | 1.5 | — | — | — | — | 0.02 | — | 14 |
| 31 | Pro. of In. | 1.5 | — | — | — | — | — | 0.05 | 16 |
| 32 | Pro. of In. | 1.5 | 0.5 | 0.2 | — | — | — | — | 17 |
| 33 | Pro. of In. | 1.5 | 0.5 | — | 0.1 | — | — | — | 22 |
| 34 | Pro. of In. | 1.5 | 0.5 | — | — | 0.05 | — | — | 18 |
| 35 | Pro. of In. | 1.5 | 0.5 | — | — | — | 0.02 | — | 28 |
| 36 | Pro. of In. | 1.5 | 0.5 | — | — | — | — | 0.05 | 24 |

SA = sodium acetate;
BE = moso bamboo extract;
GFE = grape fruit seed extract;
YE = yucca extract;
N = nisin;
BA = benzoic acid;
and Nnm. of Pre.Ds = number of preservation days;
Pro. of Co. = Product of control;
Pro. of In. = Product of the present invention Reference Example 2 (Preparation of 1,5-D-anhydrofructose Heat-Treated)

Lyase used was a specimen prepared by extracting from a red alga (*Gracilaria verrcosa*) and purified to form a single band by SDS-PAGE. A disbranching enzyme was added to an aqueous solution of maltodextrin having a DE value of about 20 (containing 30% of solids), and they were reacted each other at 60° C. for 4 hours. Then, the reaction solution was cooled to 40° C. and then, lyase was added in an amount of 15 U/gram of starch, and the incubation was conducted for 25 hours. After completion of the enzyme reaction, the reaction solution was treated with activated carbon to adsorb a colored material, and an insoluble matter was then filtered off to obtain a sample. The obtained sample contained 30% of solids, and a quantitative analysis for its sugar composition using HPLC showed that 72% was 1,5-D-anhydrofructose, 18% was glucose, and 10% was high-molecular maltodextrin. This sample was heat treated at 55° C. for 10 minutes by hot water. The resulting sample was called AF-055, and the sample resulting from the heating at 90° C. for 10 minutes was called AF-090. The sample resulting from the heating at 120° C. for 10 minutes in an autoclave was called AF-120. Each of these samples was used as 1,5-D-anhydrofructose heat-treated in Examples which will be described hereinafter. 1,5-D-anhydrofructose not heated is called AF-000. The amount of each 1,5-D-anhydrofructose added was indicated in terms of solids.

Example 6

A salt-preserved Japanese radish (pickled radish called "takuan") was desalted under running water until the salt content reached 3%. The resulting radish was immersed in a flavoring solution prescribed as shown in Table 1 in a refrigerator for 3 days. Then, a preservative shown in Table 7 was added at a concentration four times that shown in Table 7 to the flavoring solution shown in Table 1, and 300 grams of the pickled radish immersed in the flavoring solution was added to 100 ml of the resulting solution and sacked (the concentration of the preservative was a value shown in Table 7). In this Example, the 1,5-D-anhydrofructose heated at 55° C. for 10 minutes (i.e., AF-055) was used. Various test product groups were prepared in a similar process and preserved at 20° C., and the number of days of preservation was examined by observing the turbidity of the pickled radish liquid, the swelling of the sack and the like. Results are shown in Table 7.

TABLE 7

| Test No. | | AF-055(%) | Et.(%) | H.E(%) | L.S of V(%) | Ch.(%) | B.DNA(%) | LEX(%) | S.C(%) | Num. of Pre.Ds |
|---|---|---|---|---|---|---|---|---|---|---|
| 1 | Pro. of Co. | 1.5 | — | — | — | — | — | — | — | 3 |
| 2 | Pro. of Co. | — | 3.0 | — | — | — | — | — | — | 3 |
| 3 | Pro. of Co. | — | — | 0.05 | — | — | — | — | — | 3 |
| 4 | Pro. of Co. | — | — | — | 0.01 | — | — | — | — | 4 |
| 5 | Pro. of Co. | — | — | — | — | 0.2 | — | — | — | 3 |
| 6 | Pro. of Co. | — | — | — | — | — | 0.1 | — | — | 4 |

TABLE 7-continued

| Test No. | | AF-055(%) | Et.(%) | H.E(%) | L.S of V(%) | Ch.(%) | B.DNA(%) | LEX(%) | S.C(%) | Num. of Pre.Ds |
|---|---|---|---|---|---|---|---|---|---|---|
| 7 | Pro. of Co. | — | — | — | — | — | — | 0.2 | — | 3 |
| 8 | Pro. of Co. | — | — | — | — | — | — | — | 0.05 | 4 |
| 9 | Pro. of In. | 1.5 | 3.0 | — | — | — | — | — | — | 9 |
| 10 | Pro. of In. | 1.5 | — | 0.05 | — | — | — | — | — | 9 |
| 11 | Pro. of In. | 1.5 | — | — | 0.01 | — | — | — | — | 12 |
| 12 | Pro. of In. | 1.5 | — | — | — | 0.2 | — | — | — | 10 |
| 13 | Pro. of In. | 1.5 | — | — | — | — | 0.1 | — | — | 11 |
| 14 | Pro. of In. | 1.5 | — | — | — | — | — | 0.2 | — | 11 |
| 15 | Pro. of In. | 1.5 | — | — | — | — | — | — | 0.05 | 12 |
| 16 | Pro. of In. | 1.5 | 3.0 | 0.05 | — | — | — | — | — | 18 |
| 17 | Pro. of In. | 1.5 | 3.0 | — | 0.01 | — | — | — | — | 21 |
| 18 | Pro. of In. | 1.5 | 3.0 | — | — | 0.2 | — | — | — | 19 |
| 19 | Pro. of In. | 1.5 | 3.0 | — | — | — | 0.1 | — | — | 21 |
| 20 | Pro. of In. | 1.5 | 3.0 | — | — | — | — | 0.2 | — | 19 |
| 21 | Pro. of In. | 1.5 | 3.0 | — | — | — | — | — | 0.05 | 25 |
| 22 | Pro. of In. | 1.5 | — | 0.05 | 0.01 | — | — | — | — | 20 |
| 23 | Pro. of In. | 1.5 | — | 0.05 | — | 0.2 | — | — | — | 20 |
| 24 | Pro. of In. | 1.5 | — | 0.05 | — | — | 0.1 | — | — | 22 |
| 25 | Pro. of In. | 1.5 | — | 0.05 | — | — | — | 0.2 | — | 18 |
| 26 | Pro. of In. | 1.5 | — | 0.05 | — | — | — | — | 0.05 | 24 |
| 27 | Pro. of In. | 1.5 | — | — | 0.01 | 0.2 | — | — | — | 22 |
| 28 | Pro. of In. | 1.5 | — | — | 0.01 | — | 0.1 | — | — | 25 |
| 29 | Pro. of In. | 1.5 | — | — | 0.01 | — | — | 0.2 | — | 22 |
| 30 | Pro. of In. | 1.5 | — | — | 0.01 | — | — | — | 0.05 | 26 |
| 31 | Pro. of In. | 1.5 | — | — | — | 0.2 | 0.1 | — | — | 20 |
| 32 | Pro. of In. | 1.5 | — | — | — | 0.2 | — | 0.2 | — | 21 |
| 33 | Pro. of In. | 1.5 | — | — | — | 0.2 | — | — | 0.05 | 26 |
| 34 | Pro. of In. | 1.5 | — | — | — | — | 0.1 | 0.2 | — | 20 |
| 35 | Pro. of In. | 1.5 | — | — | — | — | 0.1 | — | 0.05 | 25 |
| 36 | Pro. of In. | 1.5 | — | — | — | — | — | 0.2 | 0.05 | 24 |

Et. = ethanol;
H.E = hop extract;
L.S of V = lauryl sulfate of vitamin $B_1$;
Ch. = chitosan;
B. DNA = bacterium DNA;
LEX = licorice extract;
S.C = sorboic acid;
Num. of Pre.Ds = number of preservation days;
and Pro. of In. = Product of the present invention Example 7

Various preservative components shown in Table 8 were added in the proportions shown in Table 8 to a basic composition of a hamburger prepared by blending 1,000 g of beef and pork ground together, 300 g of onion, 60 g of wheat flour and 50 g of water, and the pH of the resulting material was adjusted to 5.8 by hydrochloric acid or caustic soda. Then, hamburgers each weighing 30 grams were formed from the above material and steamed for 25 minutes and cooled. The five pieces of thus produced hamburgers per test division were prepared, and preserved at 25° C. and subjected to a preservation test by checking their appearances and smells. In this Example, the 1,5-D-anhydrofructose heated at 90° C. for 10 minutes (i.e., AF-090) was used, and the test results are shown in Table 8 by an average value of preservation days for the five hamburgers.

When the preservative of the present invention was added, no adverse influence to the quality due to the addition was observed.

TABLE 8

| Test No. | | AF-090(%) | S.A.(%) | S.L.(%) | S.F(%) | P.EX.(%) | Pro.(%) | S.ML.(%) | Num. of Pre.Ds |
|---|---|---|---|---|---|---|---|---|---|
| 1 | Pro. of Co. | 1 | — | — | — | — | — | — | 3.7 |
| 2 | Pro. of Co. | — | 0.5 | — | — | — | — | — | 3.6 |
| 3 | Pro. of Co. | — | — | 0.5 | — | — | — | — | 3.6 |
| 4 | Pro. of Co. | — | — | — | 0.5 | — | — | — | 4.2 |
| 5 | Pro. of Co. | — | — | — | — | 0.5 | — | — | 3.4 |
| 6 | Pro. of Co. | — | — | — | — | — | 0.03 | — | 3.5 |
| 7 | Pro. of Co. | — | — | — | — | — | — | 0.1 | 3.0 |
| 8 | Pro. of In. | 1 | 0.5 | — | — | — | — | — | 11.6 |
| 9 | Pro. of In. | 1 | — | 0.5 | — | — | — | — | 12.0 |
| 10 | Pro. of In. | 1 | — | — | 0.5 | — | — | — | 13.5 |
| 11 | Pro. of In. | 1 | — | — | — | 0.5 | — | — | 12.1 |
| 12 | Pro. of In. | 1 | — | — | — | — | 0.03 | — | 14.4 |
| 13 | Pro. of In. | 1 | — | — | — | — | — | 0.1 | 11.7 |

TABLE 8-continued

| Test No. | | AF-090(%) | S.A.(%) | S.L.(%) | S.F.(%) | P.EX.(%) | Pro.(%) | S.ML.(%) | Num. of Pre.Ds |
|---|---|---|---|---|---|---|---|---|---|
| 14 | Pro. of In. | 1 | 0.5 | 0.5 | — | — | — | — | 24.1 |
| 15 | Pro. of In. | 1 | 0.5 | — | 0.5 | — | — | — | 25.5 |
| 16 | Pro. of In. | 1 | 0.5 | — | — | 0.5 | — | — | 22.0 |
| 17 | Pro. of In. | 1 | 0.5 | — | — | — | 0.03 | — | 24.9 |
| 18 | Pro. of In. | 1 | 0.5 | — | — | — | — | 0.1 | 23.4 |
| 19 | Pro. of In. | 1 | — | 0.5 | 0.5 | — | — | — | 25.5 |
| 20 | Pro. of In. | 1 | — | 0.5 | — | 0.5 | — | — | 22.7 |
| 21 | Pro. of In. | 1 | — | 0.5 | — | — | 0.03 | — | 25.1 |
| 22 | Pro. of In. | 1 | — | 0.5 | — | — | — | 0.1 | 21.3 |
| 23 | Pro. of In. | 1 | — | — | 0.5 | 0.5 | — | — | 24.8 |
| 24 | Pro. of In. | 1 | — | — | 0.5 | — | 0.03 | — | 33.5 |
| 25 | Pro. of In. | 1 | — | — | 0.5 | — | — | 0.1 | 22.1 |
| 26 | Pro. of In. | 1 | — | — | — | 0.5 | 0.03 | — | 24.7 |
| 27 | Pro. of In. | 1 | — | — | — | 0.5 | — | 0.1 | 21.8 |
| 28 | Pro. of In. | 1 | — | — | — | — | 0.03 | 0.1 | 25.4 |

S.A = sodium acetate;
S.L. = sodium lactate;
S.F. = sodium fumarate;
P.EX. = red pepper extract;
Pro. = protamine;
S.ML. = sucrose monolaurate;
Num of Pre. Ds = number of preservation days;
Pro. of Co. = Product of control;
Pro. of In. = Product of the present invention Example 8

Various preservative components shown in Table 9 were added in the proportions shown in Table 9 to a basic composition of a custard cream prepared by blending 160 g of a yoke, 1,440 g of milk, 65 g of wheat flour, 65 g of starch and 600 g of sucrose, and the mixtures were boiled at a temperature of 85 to 95° C. for about 10 minutes and cooled. The resulting materials were divided into five plastic vessels per test division, and the vessels were lidded softly and the content was preserved at 150° C. for a preservation test in which their appearances and smells were checked. In this Example, the 1,5-D-anhydrofructose heated at 90° C. for 10 minutes (i.e., AF-090) was used, and the test results are shown in Table 9 by an average number of preservation days for the five custard creams.

TABLE 9

| Test No. | | AF-090(%) | Gl.(%) | P.L.(%) | G.C.(%) | S.P.(%) | Ly.(%) | Num. of Pre.Ds |
|---|---|---|---|---|---|---|---|---|
| 1 | Pro. of Co. | 1.5 | — | — | — | — | — | 3.2 |
| 2 | Pro. of Co. | — | 0.5 | — | — | — | — | 2.8 |
| 3 | Pro. of Co. | — | — | 0.02 | — | — | — | 3.2 |
| 4 | Pro. of Co. | — | — | — | 0.04 | — | — | 3.6 |
| 5 | Pro. of Co. | — | — | — | — | 0.1 | — | 2.0 |
| 6 | Pro. of Co. | — | — | — | — | — | 0.03 | 3.0 |
| 7 | Pro. of In. | 1.5 | 0.5 | — | — | — | — | 8.6 |
| 8 | Pro. of In. | 1.5 | — | 0.02 | — | — | — | 9.3 |
| 9 | Pro. of In. | 1.5 | — | — | 0.04 | — | — | 9.9 |
| 10 | Pro. of In. | 1.5 | — | — | — | 0.1 | — | 9.3 |
| 11 | Pro. of In. | 1.5 | — | — | — | — | 0.03 | 10.2 |
| 12 | Pro. of In. | 1.5 | 0.5 | 0.02 | — | — | — | 22.8 |
| 13 | Pro. of In. | 1.5 | 0.5 | — | 0.04 | — | — | 24.7 |
| 14 | Pro. of In. | 1.5 | 0.5 | — | — | 0.1 | — | 22.2 |
| 15 | Pro. of In. | 1.5 | 0.5 | — | — | — | 0.03 | 25.3 |
| 16 | Pro. of In. | 1.5 | — | 0.02 | 0.04 | — | — | 24.2 |
| 17 | Pro. of In. | 1.5 | — | 0.02 | — | 0.1 | — | 21.1 |
| 18 | Pro. of In. | 1.5 | — | 0.02 | — | — | 0.03 | 29.7 |
| 19 | Pro. of In. | 1.5 | — | — | 0.04 | 0.1 | — | 20.9 |
| 20 | Pro. of In. | 1.5 | — | — | 0.04 | — | 0.03 | 23.3 |
| 21 | Pro. of In. | 1.5 | — | — | — | 0.1 | 0.03 | 23.3 |

Gl. = glysine;
P.L. = polylysine;
G.C. = capric monoglyceride;
S.P. = sodium polyphosphate;
Ly. = lysozyme;
Num. of Pre.Ds = number of preservation days;
Pro. of Co. = Product of control;
Pro. of In. = Product of the present invention

Example 9

Various preservative components shown in Table 5 were added in the proportions shown in Table 10 to a basic composition of Chinese noodles produced by blending 500 g of extra-strength flour, 160 ml of water and 5 g of a brine powder. The mixture was mixed sufficiently and placed into a small-sized noodle-making machine to form noodle strands. The noodles were boiled in boiling water for 4 minutes and then cooled. The obtained noodles were drained and then put into polyethylene sacks, which were then sealed. Ten sacks per test division were preserved in a constant-temperature vessel at 25° C., and change in their appearances was observed. In this Example, the 1,5-D-anhydrofructose heated at 90° C. for 10 minutes (i.e., AF-090) was used. The evaluation was carried out in the same manner as Example 4. The test samples in the ten sacks were evaluated by examining the number of days taken till the occurrence of the discoloration and the softening or the generation of slime and mold at one point on the test samples and taking an average value of the numbers of days as an effective number of preservation days. Results are shown in Table 10.

Example 10

80 Grams of a powdery soup stock (produced by Yamaki, Co.) and 400 ml of Raw soy sauce (manufactured by Fukuoka Prefecture Brewage Association) were added to 2 liters of water to prepare a noodle soup. Each of a product of a control and a product of the present invention was divided in an amount of 100 ml into beakers. Chemicals were added to the beakers according to a prescription shown in Table 11 to produce test sample groups (Nos. 1 to 18). In this case, the 1,5-D-anhydrofructose heated at 120° C. for 10 minutes (i.e., AF-120) was used.

Eight heat-resistant polyethylene sacks per each of test Nos. 1 to 18 were prepared, and the noodle soup was charged in an amount of 10 ml into each of the eight sacks, which were then heat-sealed. The contents of the sacks were preserved at 30° C. without being subjected to a hot-water sterilization, for a preservation test in which the liquid turbidity and the swelling were observed. Results are shown in Table 11. The observation was continued until all of the contents of the eight sacks were changed in quality, and an average number of preservation days is shown as a number of preservation days.

TABLE 10

| Test No. | | AF-090(%) | Ly. (%) | Pr. (%) | Gl. (%) | Al. (%) | Num. of Pre.Ds |
|---|---|---|---|---|---|---|---|
| | Non-added | — | — | — | — | — | 2.3 |
| 1 | Pro. of Co. | 1.5 | — | — | — | — | 3.7 |
| 2 | Pro. of Co. | — | 0.05 | — | — | — | 2.6 |
| 3 | Pro. of Co. | — | — | 0.05 | — | — | 3.7 |
| 4 | Pro. of Co. | — | — | — | 0.5 | — | 2.7 |
| 5 | Pro. of Co. | — | — | — | — | 1 | 3.5 |
| 6 | Pro. of In. | 1.5 | 0.05 | — | — | — | 9.1 |
| 7 | Pro. of In. | 1.5 | — | 0.05 | — | — | 10.2 |
| 8 | Pro. of In. | 1.5 | — | — | 0.5 | — | 9.9 |
| 9 | Pro. of In. | 1.5 | — | — | — | 1 | 9.1 |
| 10 | Pro. of In. | 1.5 | 0.05 | — | 0.5 | — | 12.7 |
| 11 | Pro. of In. | 1.5 | — | 0.05 | 0.5 | — | 14.5 |

Ly. = lysozyme;
Pr. = protamine;
Gl. = glysine;
Al. = Alanine;
Num. of Pre.Ds = number of preservation days;
Pro. of Co. = Product of control;
Pro. of In. = Product of the present invention

TABLE 11

| Test No. | | AF-120(%) | SA(%) | BE(%) | GFE(%) | YE(%) | N(%) | BA(%) | Nnm. of Pre.Ds |
|---|---|---|---|---|---|---|---|---|---|
| 1 | Pro. of Co. | 0.75 | — | — | — | — | — | — | 3.6 |
| 2 | Pro. of Co. | — | 0.5 | — | — | — | — | — | 2.2 |
| 3 | Pro. of Co. | — | — | 0.2 | — | — | — | — | 2.6 |
| 4 | Pro. of Co. | — | — | — | 0.1 | — | — | — | 1.9 |
| 5 | Pro. of Co. | — | — | — | — | 0.05 | — | — | 2.4 |
| 6 | Pro. of Co. | — | — | — | — | — | 0.02 | — | 4.9 |
| 7 | Pro. of Co. | — | — | — | — | — | — | 0.05 | 5.1 |
| 8 | Pro. of In. | 0.75 | 0.5 | — | — | — | — | — | 8.5 |
| 9 | Pro. of In. | 0.75 | — | 0.2 | — | — | — | — | 8.5 |
| 10 | Pro. of In. | 0.75 | — | — | 0.1 | — | — | — | 7.1 |
| 11 | Pro. of In. | 0.75 | — | — | — | 0.05 | — | — | 8.0 |
| 12 | Pro. of In. | 0.75 | — | — | — | — | 0.02 | — | 11.3 |
| 13 | Pro. of In. | 0.75 | — | — | — | — | — | 0.05 | 13.2 |
| 14 | Pro. of In. | 0.75 | 0.5 | 0.2 | — | — | — | — | 16.6 |
| 15 | Pro. of In. | 0.75 | 0.5 | — | 0.1 | — | — | — | 14.0 |

TABLE 11-continued

| Test No. | | AF-120(%) | SA(%) | BE(%) | GFE(%) | YE(%) | N(%) | BA(%) | Nnm. of Pre.Ds |
|---|---|---|---|---|---|---|---|---|---|
| 16 | Pro. of In. | 0.75 | 0.5 | — | — | 0.05 | — | — | 15.3 |
| 17 | Pro. of In. | 0.75 | 0.5 | — | — | — | 0.02 | — | 22.0 |
| 18 | Pro. of In. | 0.75 | 0.5 | — | — | — | — | 0.05 | 25.5 |

SA = sodium acetate;
BE = moso bamboo extract;
GFE = Grape fruit seed extract;
YE = yucca extract;
N = nisin;
BA = benzoic acid;
and Nnm. of Pre.Ds = number of preservation days;
Pro. of Co. = Product of control;
Pro. of In. = Product of the present invention Test Example 1 (Influence of Heating Time and Heating Temperature to Antibacterial Power of AF)

AF was subjected to an antibacterial power test using a turbidimetry. More specifically, a soybean-casein digest broth medium (having a pH value of 5.5) previously sterilized and 1% of AF were placed into a test tube and heated under heating conditions shown in Table 12. Then, $8.7 \times 10^4$ CFU of *Bacillus subtillis* IAM 1249 was inoculated into the test tube, shake culture was carried out at 37° C. for 72 hours, and the turbidity (OD, 660 nm) was then measured. Results are shown in Table 12.

TABLE 12

| Heating condition | OD$^{660}$ |
|---|---|
| Control with no addition of AF | 1.160 |
| Control with 1% of AF added and not heated | 0.836 |
| After addition of 1% of AF, | |
| Heated at 55° C. for 10 minutes | 0.513 |
| Heated at 60° C. for 10 minutes | 0.437 |
| Heated at 80° C. for 10 minutes | 0.355 |
| Heated at 90° C. for 10 minutes | 0.338 |

As seen in Table 12, a sample heated at 55° C. for 10 minutes after addition of 1% of AF shows an antibacterial power $(1.160-0.513)/(1.160-0.836)$ which is about two times that of the control with 1% of AF added and not heated.

Test Example 2 (Influence of Heating on Effect of AF, and Preservation Test for Noodle Soup Series)

40 Grams of a powdery soup stock (produced by Yamaki, Co.) and 200 ml of commercially available soy sauce were added to 1,000 ml of water to prepare a noodle soup. Bacteria were inoculated into the noodle soup, and the noodle soup was preserved at 30° C., and then, the number of living bacteria was counted. Results are shown in FIGS. 3 and 4. FIG. 3 is a curve showing the number of living *Bacillus subtillis* IAM 1249 (which will be simply referred to as *B. subtillis* hereinafter), and FIG. 4 is a curve showing the number of living *Escherichia coli* NRIC 1023 (which will be simply referred to as *E. coli* hereinafter). In FIGS. 3 and 4, A-1 and A'-1 are curves each indicating the number of living *B. subtillis* or *E. coli* inoculated into the unsterilized noodle soup. In the cases of A-1 and A'-1,1,5-D-anhydrofructose was not added, and P and P' indicate the number of bacteria initially generated.

A-2 and A'-2 are curves each indicating the number of living *B. subtillis* or *E. coli* inoculated into the noodle soup sterilized by heating in hot water at 550° C. for 10 minutes. In the cases of A-2 and A'-2,1,5-D-anhydrofructose was not added, and the numbers of bacteria initially generated are indicated by Q and Q', respectively. B-1 and B'-1 are curves each indicating the number of living *B. subtillis* or *E. colli* inoculated into the unsterilized noodle soup containing 1% of 1,5-D-anhydrofructose added thereto, and the numbers of bacteria initially generated are indicated by P and P'. B-2 and B'-2 are curves each showing the number of living *B. subtillis* or *E. colli* inoculated into the noodle soup which was sterilized by heating and into which 1,5-D-anhydrofructose was added after cooling of the noodle soup, and the numbers of bacteria initially generated are indicated by Q and Q'. B-3 and B'-3 are curves each showing the number of living *B. subtillis* or *E. colli* inoculated into the noodle soup sterilized by heating at 550° C. for 10 minutes after addition of 1,5-D-anhydrofructose, and the numbers of bacteria initially generated are indicated by R and R'.

The following facts (1) and (2) can be seen from FIGS. 3 and 4:

(1) The numbers of both living *B. subtillis* and *E. colli* were reduced by about one figure (from Q to R, and from Q' to R') by heating after addition of 1,5-D-anhydrofructose. From this, it can be seen that 1,5-D-anhydrofructose has an effect of enhancing a heat sterilization effect against gram-positive and gram-negative bacteria.

(2) In the noodle soup containing 1,5-D-anhydrofructose added thereto, the proliferation of both of the *B. subtillis* and *E. colli* was suppressed (from the comparison of the B-2 with B-3 and the comparison of the B'-2 with B'-3). From this, it can be seen that when the noodle soup is heated after addition of 1,5-D-anhydrofructose thereto, the proliferation-suppressing effect is further enhanced against the gram-positive bacteria and also increased against the gram-negative bacteria against which the 1,5-D-anhydrofructose originally has a weak proliferation suppressing effect.

Test Example 3 (Heating Effect Exerted to the Antibacterial Power of AF, and Test for Noodle Soup)

40 Grams of a powdery soup stock (produced by Yamaki, Co.), 200 ml of commercially available soy sauce and 2% of AF were added to 1000 ml of water. The mixture was aseptically filtered and charged in an amount of 100 ml into each of ten polypropylene sacks previously sterilized. Meanwhile, 1 ml of the noodle soup (containing a number of living bacteria of $3.1 \times 10^6$/ml) deteriorated due to "swelling" caused by *Lactobacillus casei* was charged into each of the above-prepared ten sacks, which were then sealed so as air not to be left therein. The ten sacks were divided into two groups each consisting of five sacks. One of the groups was not heated, and the other group was heated in a hot water at 55° C. for 10 minutes. Then, both of them were preserved at 30° C., and the occurrence of "swelling" was observed. Results are shown in Table 13.

TABLE 13

| Group | Number of preservation days | | | |
|---|---|---|---|---|
| | 5 | 10 | 15 | 20 |
| Not heated | 4/5 | 0/5 | — | — |
| Heated | 5/5 | 3/5 | 1/5 | 0/5 |

In Table, denominator shows the total number of sacks, and numerator shows the number of normal sacks.

It can be seen from Test Examples 1 to 3 that the antibacterial power of AF increased by the heating, and the noodle soup containing AF added thereto was difficult to deteriorate, namely, the preservability of the AF-added food was enhanced.

Example 11 (Curry)

7 Parts of beef, 57 parts of vegetables (12 parts of potato, 40 parts of onion and 5 parts of carrot), 1 part of a curry powder, 6 parts of fatty oil, 0.2 parts of sodium glutamate, 1 part of starch and 40 parts of a soup were mixed together, and the mixture was heated and cooked at 80° C. for 1 hour. The resulting product was a curry containing a somewhat larger amount of soup and having a low viscosity. The following operations were conducted in a clean bench. The curry was subdivided each in an amount of 95 grams into ten plugged vessels previously sterilized. The ten vessels were divided into two groups each consisting of five vessels.

A 30% solution of AF subjected to an aseptic filtration was added in an amount of 5 g into each of the vessels in one of the groups. Then, $2\times10^5$ nutritious cells of *Bacillus subtillis* incubated previously were inoculated into the group, and was mixed uniformly. Five grams of a 30% solution of AF subjected to an aseptic filtration was added into each of the vessels in the other group. Then, $2\times10^5$ nutritious cells of *Bacillus subtillis* incubated previously were inoculated into the group, and after mixing uniformly, heated at 60° C. for 10 minutes and then cooled rapidly. Both of the groups were preserved at 300° C., and the preservability of them was compared by a sensory evaluation test. Results are shown in Table 14.

TABLE 14

| | Preservation time | | | | |
|---|---|---|---|---|---|
| | 12 | 24 | 36 | 48 | 60 |
| Not heated | 5/5 | 5/5 | 0/5 | — | — |
| Heated | 5/5 | 5/5 | 5/5 | 5/5 | 0/5 |

In Table, denominator shows the total number of vessels, and numerator shows the number of normal vessels.

Example 12 (Steamed Bread)

1,000 Parts of a weak flour, 250 parts of a liquid shortening, 1,000 parts of a liquid egg, 900 parts of very fine sugar, 100 parts of a powdery cheese, 10 parts of a baking powder, 10 parts of salt, 10 parts of AF, 3 parts of xanthan gum, 10 parts of gliadin and 300 parts of warm water were thrown as starting materials into a mixer. They were mixed together at a medium speed for 5 minutes and fermented for about 2 hours. The resulting material was divided into 50 g of blocks, the blocks were placed into a mold and were steamed for 30 minutes.

A group (control) with no addition of AF was made in a similar manner to one described above, except that the amount of warm water was adjusted by correcting the amount of water transferred from AF, and the preservability of both of the control group and the group of the present invention were compared with each other. More specifically, ten samples were prepared in each of the groups and preserved at room temperature (20 to 30° C.) and thereafter, the number of days taken till generation of slime was examined. Results are shown in Table 15.

TABLE 15

| | Number of days | | | | | |
|---|---|---|---|---|---|---|
| | 1 | 2 | 3 | 4 | 5 | 6 |
| Example 12 | 10/10 | 10/10 | 10/10 | 9/10 | 5/10 | 0/10 |
| Control | 10/10 | 10/10 | 9/10 | 0/10 | — | — |

In Table, denominator shows the total number of samples, and numerator shows the number of normal samples Example 13 (Kneaded Bean Jam)

30 Parts of powder bean jam, 40 parts of sugar, 1 part of AF, 130 parts of water were mixed together to make a kneaded bean jam. The mixture was boiled down, so that the initial weight was reduced to one fourth (Example 13). A group (control) with no addition of AF thereto, too, was made in a similar manner to one described above, except that the amount of warm water was adjusted by correcting the amount of water transferred from AF. Each of the control group and the group of the present invention was filled into a plastic cup, and the preservation effects of both of the groups were compared at the temperature of 30° C. Results are shown in Table 16. The unit in Table 16 is a number of living bacteria, mold and yeast per gram.

TABLE 16

| | | Number of preservation days | | | | | |
|---|---|---|---|---|---|---|---|
| | | 0 | 1 | 2 | 3 | 4 | 5 |
| Ex. 13 | Number of common living bacteria | $1 \times 10$ | $7 \times 10$ | $1 \times 10^3$ | $5 \times 10^4$ | $6 \times 10^5$ | $8 \times 10^6$ |
| | Number of mold and yeast | 10> | 10> | $4 \times 10^2$ | $1 \times 10^2$ | $1 \times 10^3$ | $1 \times 10^4$ |
| Control | Number of common living bacteria | $1 \times 10$ | $3 \times 10^3$ | $1 \times 10^5$ | $10^7<$ | — | — |
| | Number of mold and yeast | 10> | $2 \times 10^3$ | $4 \times 10^4$ | $7 \times 10^5$ | — | — |

Ex.: Example

Example 14 (Boiled Rice)

900 Grams of rice was washed with water, and 1,080 ml of water and 2.25 g of AF (0.25% based on the rice) were added to the rice. The resulting rice mixture was cooked using an 1.8-liter electric rice-cooker (Example 14). On the other hand, a boiled rice (a control) was produced in a similar manner to one described above, except that AF was not added, and the amount of water transferred from AF was corrected similarly, and the preservability of the boiled rice of the example 14 and of the control were compared with each other. That is, each of the boiled rice was transferred into a rice tub and preserved at room temperature (18 to 30° C.), and times taken till generation of an acid smell were compared. The results showed that 50 hours was taken for the boiled rice in the example 14, and 20 hours was taken for the boiled rice in the control. The boiled rice in the example 14 at the time when it was transferred into the rice tub has no problem even in respect of flavor.

Example 16 (Flour Paste)

20 Grams of corn starch, 35 grams of a weak flour, 30 grams of a skim milk powder, 20 grams of a powdered milk, 150 grams of margarine, 250 grams of sugar, 3 grams of xanthan gum, 10 grams of AF and 492 grams of water were mixed together in a total amount of 1,020 grams to prepare a flour paste. The flour paste was boiled down, so that 10% by weight based on the total amount was reduced (Example 16). A group (control) with no addition of AF thereto was made in a similar manner described above, except that the amount of water transferred from AF was corrected. The products in the Example 16 and in the control were preserved at 20° C., and the preservability of both of the products were compared with each other by counting the numbers of living bacteria per gram after the preservation. Results are shown in Table 18.

TABLE 18

| | pH of Product | \multicolumn{7}{c}{Number of preservation days} |
|---|---|---|---|---|---|---|---|---|
| | | 1 | 2 | 3 | 4 | 5 | 6 | 7 |
| Ex. 16 | 6.35 | $3 \times 10$ | $1 \times 10^2$ | $4 \times 10^3$ | $5 \times 10^3$ | $4 \times 10^4$ | $7 \times 10^5$ | $9 \times 10^8$ (Putrefied) |
| Control | 6.30 | $1 \times 10^3$ | $6 \times 10^3$ | $5 \times 10^5$ | $9 \times 10^6$ (Putrefied) | — | — | — |

Ex. : Example

Example 15 (Boiled Bean)

Heat-resistant spore forming bacteria were inoculated in the proportion of $10^3$/gram into a mixture of 100 parts of a sugar solution having a Brix 55 and 2 parts of AF added to 100 parts of steamed kidney beans. The resulting material was heated at 80° C. for 1 hour and then left to stand at 50° C. for 15 hours. Then, the material was drained, sacked, sealed and subjected to a heat sterilization at 100° C. for 40 minutes (Example 15). A group (control) with no addition of AF thereto was made in a similar manner described above, except that the amount of water transferred from AF was corrected. The products in the Example 15 and in the control were preserved at 300° C., and the preservability of both of them were compared with each other by counting the number of heat-resistant spore forming bacteria per gram. Results are shown in Table 17. To count the number of heat-resistant spore forming bacteria, each of the products was heated at 95° C. for 10 minutes to kill bacteria other than the spore bearing bacteria and then cultured in a standard agar culture medium at 30° C. for 48 hours. The number of colonies generated as a result of the culturing was taken as the number of heat-resistant spore forming bacteria.

TABLE 17

| | pH of Product | \multicolumn{4}{c}{Number of preservation days} |
|---|---|---|---|---|---|
| | | 1 | 2 | 3 | 4 |
| Ex. 15 | 6.4 | $5 \times 10^2$ | $7 \times 10^2$ | $2 \times 10^3$ | $4 \times 10^3$ |
| Control | 6.4 | $6 \times 10^3$ | $7 \times 10^5$ | $1 \times 10^7$ (putrefied) | — |

Ex.: Example

Example 17 (Boiled Fish Paste called "Kamaboko")

30 Grams of salt was added to 1 kg of frozen ground meat of walleye pollack, and the resulting ground fish meat was mashed with its temperature being maintained at 10° C. or lower for 25 minutes. Five minutes before the completion of the mashing, 50 g of white potato starch, 5 g of AF, 80 g of sugar and 300 g of ice water were added. The ground fish meat after the completion of the mashing was placed into a polyvinylidene chloride film having a diameter of 60 mm and a length of 250 mm, and the film was fastened and left to stand for 90 minutes in a constant-temperature vessel at 40° C. Thereafter, the material in the film was heated for 40 minutes in a warm bath having a temperature of 85° C. and then cooled immediately with cold water, so that the temperature of a central portion of a product was equal to or lower than 30° C., thus producing a boiled fish paste (Example 17). Meanwhile, a boiled fish paste (a control) was made in a similar manner, except that the amount of water transferred from AF was corrected without addition of AF, and the preservability and qualities of the pastes in the Example 17 and in the control were compared with each other. That is, the evaluation of the preservability was carried out by leaving the boiled fish paste to stand in a constant-temperature vessel at 30° C., and observing the presence or absence of the putrefaction and discoloration. The results showed that in the boiled fish paste in the Example 17, the symptom of the putrefaction appeared slightly after lapse of 12 days and the discoloration was observed after lapse of 15 days, whereas in the control, the putrefaction was observed after lapse of 7 days and the discoloration was observed after lapse of 9 days.

Example 18 (Sauce for Grilled Meat)

600 ml of unrefined soy sauce (moromi) was heated, and 2 ml of acetic acid, 140 g of sugar, 100 ml of a sweet sake, 10 g of sodium glutamate, 20 g of AF, 10 ml of sesame oil and about 210 ml of water were incorporated into the unrefined soy sauce. The mixture was agitated and heated to produce a sauce for grilled meat (Example 18). A sauce with no addition of AF (a control) was made in a similar manner, except that the amount of water transferred from AF was corrected. These sauces were charged into a small sack and sterilized by hot water at 60° C. for 10 minutes, and the preservability of both of the sauces were then compared at 30° C. Results are shown in Table 19.

and in the control at 30° C. were compared with each other by counting the numbers of living bacteria per gram. Results are shown in Table 20.

TABLE 20

|  | pH of Product | | Number of preservation days | | | |
|---|---|---|---|---|---|---|
|  | Flavoring solution | Chopped burdock root cooked | 0 | 3 | 8 | 10 |
| Ex.19 | 4.8 | 5.8 | <10 | 2.0 × 10 | <10 | Mold+ |
| Control | 4.8 | 5.8 |  |  |  | Foul smell± |
|  |  |  | 2.0 × 10 | 3.0 × 10 | 3.4 × 10$^6$ | Mold++ Foul smell+ |

Ex.: Example

TABLE 19

(Unit: number of living bacteria, mold and yeast per gram)

| | | Number of days | | | | | |
|---|---|---|---|---|---|---|---|
| | | 0 | 1 | 2 | 3 | 4 | 5 |
| Ex. 18 | Number of common living bacteria | 1 × 10 | 7 × 10 | 1 × 10$^3$ | 5 × 10$^4$ | 6 × 10$^5$ | 8 × 10$^6$ |
| | Number of mold and yeast | 10> | 10> | 4 × 10$^2$ | 1 × 10$^2$ | 1 × 10$^3$ | 1 × 10$^4$ |
| Control | Number of common living bacteria | 1 × 10 | 3 × 10$^3$ | 1 × 10$^5$ | 10$^7$< | — | — |
| | Number of mold and yeast | 10> | 2 × 10$^3$ | 4 × 10$^4$ | 7 × 10$^5$ | — | — |

Ex.: Example

Example 19 (Kimpira-gobou (Chopped Burdock Root Cooked in Soy and Sesame Oil))

A flavoring solution having a composition comprising sugar, sweet sake and soy at a weight ratio of 1:1:4 was added to chopped burdock root at a weight ratio of the burdock root to the flavoring solution of 3:1. The resulting material was fried for 3 minutes with a medium-power flame to provide a product of chopped burdock root cooked in soy and sesame oil. The product containing AF added in an amount of 3% based on the total amount is called an Example 19. A product was produced without addition of AF in a similar manner, except that the amount of water transferred from AF was corrected, and this product is called a control. The preservability of the products in the Example 19

Example 20 (Canned Coffee)

A coffee drink was made by blending 1 kg of milk, 300 g of a skim milk powder, 2 kg of sugar, 600 g of a coffee extract, 15 kg of water and 200 g (1%) of AF. When the coffee drink was canned, spores of *Bacillus stearothermophilus* previously separated and cultured from a coffee drink can polluted with flat sour spoilage bacteria were inoculated in an amount of 10$^3$ spores per can into the coffee drink. The resulting coffee drink was sterilized by heating at 120° C. for 20 minutes in a conventional process (Example 20). A canned coffee drink with no addition of AF was produced in a similar manner (a control). Then, the two canned coffee drinks were preserved in a constant-temperature vessel at 55° C., and the preservability were compared with each other by observing the occurrence of the deterioration. Results are shown in Table 21. Before the preservation test, the flavor and taste of the canned coffee in the Example were not different from those in the control, and it was recognized that there was no adverse influence due to the addition of AF.

TABLE 21

| | Number of preservation days | | | |
|---|---|---|---|---|
| | 5 | 10 | 20 | 30 |
| Ex.20 | 10/10 | 10/10 | 10/10 | 10/10 |
| Control | 6/10 | 0/10 | — | — |

Ex.: Example

Numerator shows the number of normal cans, and denominator shows the total number of cans

Examples 21 and 22 (Potato Salad)

657 Grams of boiled potato, 50 grams of onion, 100 grams of boiled carrot, 100 grams of cucumber, 10 grams of common slat and 83 grams of mayonnaise were mixed well together to produce a potato salad. A salad made by mixing 15 grams of AF-090 with mayonnaise is called an Example 21; a salad made by mixing 15 grams of AF-000 with mayonnaise is called an Example 22, and a salad made with no addition of AF and with the amount of water transferred from AF-090 being corrected is called a control. These salads were placed into lidded containers and preserved at 20° C., and preservability of them were compared by counting the microorganisms and examining the appearances during the preservation. Results are shown in Table 22. The produced potato salads had a pH value of 5.3.

TABLE 22

(Unit: number of living bacteria, mold and yeast per gram)

|  |  | Number of preservation days | | | | | |
|---|---|---|---|---|---|---|---|
|  |  | 0 | 1 | 2 | 3 | 4 | 5 |
| Ex.21 | Number of living common bacteria | $5.7 \times 10^2$ | $1.6 \times 10^3$ | $9.3 \times 10^3$ | $4.7 \times 10^4$ | $9.1 \times 10^4$ | $9.2 \times 10^5$ |
|  | Number of mold and yeast | $1.0 \times 10^2$ | $6.1 \times 10^2$ | $9.8 \times 10^2$ | $2.3 \times 10^3$ | $8.4 \times 10^3$ | $6.2 \times 10^4$ |
|  | Appearance | — | — | — | — | − | — |
| Control | Number of living common bacteria | $2.1 \times 10^3$ | $2.2 \times 10^4$ | $3.9 \times 10^6$ | $2.0 \times 10^7$ | − | — |
|  | Number of mold and yeast | $1.2 \times 10^2$ | $1.0 \times 10^3$ | $3.5 \times 10^4$ | $1.4 \times 10^6$ | − | — |
|  | Appearance | — | — | — | Mold and putrefaction+ | ++ | — |
| Ex.22 | Number of living common bacteria | $1.1 \times 10^3$ | $4.5 \times 10^3$ | $1.9 \times 10^4$ | $4.4 \times 10^5$ | $6.4 \times 10^6$ | — |
|  | Number of mold and yeast | $1.2 \times 10^2$ | $1.5 \times 10^2$ | $1.0 \times 10^4$ | $5.4 \times 10^5$ | $8.1 \times 10^6$ | — |
|  | Appearance | — | — | — | — | — | Mold+ |

Ex.: Example

Examples 23 and 24 (Cut Vegetables)

Commercially available fresh cut vegetables (lettuce and cabbage) for a salad were soaked in two test solutions for 30 minutes and then slightly washed with water for 30 seconds. After these vegetables were drained, they were preserved at 10° C. for 24 hours, and the numbers of bacteria was counted. One test solutions (Example 23) contained 3% heat-treated AF-090, the other solution (Example 24) contained 3% AF-000 were used as soaking solutions, and the control solution contained only water. Results are shown in Table 23. It was observed by naked eyes that a difference in freshness appeared largely between the Examples and the control more than a difference between numbers of living bacteria.

TABLE 23

| Item | | Before soakage | After 24 hours |
|---|---|---|---|
| Ex.23 | Number of common living bacteria per gram | $4.0 \times 10^5$ | $8.1 \times 10^5$ |
|  | Number of colon bacilli per gram | $2.0 \times 10^3$ | $3.5 \times 10^2$ |
|  | pH | 6.7 | 6.4 |
| Ex.24 | Number of common living bacteria per gram | $3.4 \times 10^5$ | $3.1 \times 10^6$ |
|  | Number of colon bacilli per gram | $1.8 \times 10^3$ | $8.6 \times 10^3$ |
|  | pH | 6.7 | 6.5 |
| Control | Number of common living bacteria per gram | $4.3 \times 10^5$ | $9.8 \times 10^6$ |
|  | Number of colon bacilli per gram | $3.5 \times 10^3$ | $4.2 \times 10^4$ |
|  | pH | 6.7 | 6.5 |

Ex.: Example

Examples 25 and 26 (Ingredient-Containing Boiled Rice)

900 grams of rice was washed with water, and 1,080 ml of water, ingredients for edible wild plant-containing boiled rice (for four servings, a product of Nagatanien, Co.) and 2.25 grams (in a proportion of 0.25% to the rice) of AF-120 were added to the washed rice. The resulting rice material was boiled in a 1.8 liter electric rice-cooker (Example 25). On the other hand, an ingredient-containing boiled rice was produced without addition of AF-120 in a similar manner described above, except that the amount of water transferred from AF-120 was corrected (a control), and an ingredient-containing boiled rice was produced with the same amount of AF-000 added in a similar manner (Example 26). The preservability of the three products were compared with one another. That is, each of the boiled rice products were transferred into rice tubs and preserved at room temperature (24 to 32° C.), and the times taken till the generation of acid smell were compared. As a result, in the boiled rice in the Example 25, 36 hours were taken; in the control, 16 hours were taken; and in the Example 26, 24 hours were taken. The boiled rice in the Example 25 at the time when it was transferred into the rice tub had no problem even in respect of flavor.

Examples 27 and 28 (Pork Sausage)

5 Grams of a spice was added to 1,000 grams of a minced meat of pork, and they were mixed together for 2 minutes in a mashing machine. Then, 20 grams of a natural flavoring containing 50% of common salt was added to the mixture, and the resulting mixture was mashed for 2 minutes. Further, 80 grams of starch, 20 grams of soybean oil, 40 grams of albumen, 20 grams of AF-120 and 120 grams of broken ice and water were added, and the mixture was smashed for 2 minutes. The resulting kneaded meat material was stuffed into a sheep intestine as a stuffer having a diameter of 14 to 22 mm and tied up at a length of about 10 cm. Subsequently, the material was heated for 15 minutes in warm water having a temperature of 70° C. and then left to stand, thereby producing a pork sausage (Example 27). On the other hand, a pork sausage was produced in a similar manner, except that the AF-120 was replaced by AF-000 (Example 28). Both of the pork sausages were preserved at 15° C., and the preservability thereof were compared by examining the pH value, the number of living bacteria per gram and the appearance. Results are shown in Table 24.

TABLE 24

| | Number of preservation days | | | |
|---|---|---|---|---|
| Item | 1 | 7 | 9 | 12 |
| Ex.27 pH | 6.37 | 6.33 | 6.42 | 6.33 |
| Number of living common bacteria | <10 | $1.5 \times 10^2$ | $2.5 \times 10^3$ | $5.4 \times 10^4$ |
| Appearance | — | — | — | — |
| Ex.28 pH | 6.48 | 6.45 | 6.45 | 6.54 |
| Number of living common bacteria | <10 | $6.4 \times 10^3$ | $5.1 \times 10^5$ | $2.0 \times 10^7$ |
| Appearance | — | — | — | Softened, and smelling of putrefaction |

Ex.: Example

Examples 29 and 30 (Fried Egg)

400 Grams of a raw egg liquid, 88 grams of a soup stock, 2 grams of common slat, 22 grams of sugar and 7.8 grams of AF-090 were agitated and mixed sufficiently in a homogenizer. The mixture was fried using an frying pan to produce a fried egg (Example 29). A fried egg was produced in a similar manner, except that AF-090 was replaced by AF-000 (Example 30). Both of the fried eggs were preserved at 30° C., and the preservability thereof was compared. Results are shown in Table 25.

TABLE 25

| | | Preservation time (hr) | |
|---|---|---|---|
| Item | | 24 | 48 |
| Ex.29 | Number of living common bacteria per gram pH | <10 7.2 | $3.1 \times 10^5$ 6.3 |
| Ex.30 | Number of living common bacteria per gram pH | $6.7 \times 10^2$ 6.7 | $5.1 \times 10^6$ — |

Ex.: Example

Examples 31, 32, 33 and 34 (Pickled Radish Called "Takuan")

A roughly pickled radish (containing 7.0% of salt) was desalted and then sacked to produce a flavored pickled radish. In this case, AF was added in a process described in the Notes given below, and four combinations (Examples 31 to 34) were made as test divisions, as described in Table 26 and preserved at 20° C. The number of preservation days was examined by observing the turbidity of the liquid of the pickled radish, the swelling of the sack and the like. Results are shown in Table 26.

TABLE 26

| Addition of AF | At the time of desalting | At the time of flavoring | Number of preservation days |
|---|---|---|---|
| Ex.31 | Not added | 0.1% of AF-000 | 5 days |
| Ex.32 | Not added | 0.1% of AF-055 | 8 days |

TABLE 26-continued

| Addition of AF | At the time of desalting | At the time of flavoring | Number of preservation days |
|---|---|---|---|
| Ex.33 | 0.1% of AF-000 | 0.1% of AF-000 | 9 days |
| Ex.34 | 0.1% of AF-055 | 0.1% of AF-055 | 18 days |

Ex.: Example
Notes)
1. The pH value of radish was 6.5, and the pH value of the flavoring solution was 5.0
2. Addition of AF at the time of desalting Ratio of the weight of pickled radish to the weight of water = 1:3 AF-055 was added in an amount of 0.1% based on the total weight of the solid and liquid. Left to stand at 5° C. for 24 hours.
3. Addition of AF at the time of flavoring Ratio of the pickled radish to the flavoring solution = 7:3 (by weight) AF-005 was added in an amount of 0.1% based on the total weight of the solid and liquid. Sacked and then heated at 60° C. for 10 minutes.

Examples 35 and 36 (Fruit Juices)

VF strains of *Alicyclobacillus acidoterrestris* previously cultured were added to a juice product made by adding 0.5% of AF-090 and water to a concentrated grape fruit juice and adjusted to a Brix degree of 11, so that a concentration of $10^3$/ml in terms of bacteria in the fruit juice was obtained (Example 35). An orange juice was also produced in a similar manner (Example 36). These juices were preserved at 30° C. for 21 days. Further, a juice was made as a control without addition of AF. The states of the juices preserved were evaluated, and the state of the juice preserved, in which a foul taste, a foul smell and the turbidity of the liquid were not detected at all, was taken as "−", Results are shown in Table 27.

TABLE 27

| Example | Fruit juice | pH | Brix degree | AF-090 | Preservation state |
|---|---|---|---|---|---|
| Ex.35 | Grape fruit juice | 3.1 | 11.0 | 0.5% | − |
| Ex.36 | Orange juice | 3.5 | 11.2 | 0.5% | − |
| Control | Grape fruit juice | 3.1 | 11.0 | — | + |
| | Orange juice | 3.5 | 11.2 | — | + |

Ex.: Example

The growing state of the VF strains cultured at 35° C. for 5 days in a K-culturing medium was confirmed. The K-culturing medium (pH 3.7) has the following composition:

2.5 grams of yeast extract, 5.0 grams of peptone, 1.0 gram of glucose, 1.0 gram of Tween 80, 15 grams of agar and 990 ml of deionized water; and the medium was adjusted to a pH value of 3.7 with a 25% solution of malic acid.

What is claimed is:

1. A process for producing a food having excellent preservability, comprising the step of heating a food while adding 1,5-D-anhydrofructose to a food, or the steps of adding 1,5-D-anhydrofructose to a food and then heating the food, wherein 1,5-D-anhydrofructose is added in the proportion of 0.01 to 10% by weight based on the food and the heating is carried out at a temperature of 50 to 250° C. and for a time of 1 second to 300 minutes.

2. A process for producing a food having excellent preservability, comprising the step of heating a food while adding 1,5-D-anhydrofructose previously subjected to a heat treatment to a food, or the steps of adding 1,5-D-anhydrofructose previously subjected to a heat treatment to a food and then heating the food, wherein 1,5-D- anhydrofructose previously subjected to a heat treatment is added in the proportion of 0.01 to 10% by weight based on the food and the heating is carried out at a temperature of 50 to 250° C. and for a time of 1 second to 300 minutes.

3. The process according to claim 2, wherein heating conditions for the 1,5-D-anhydrofructose previously subjected to the heat treatment are a temperature of 50 to 150° C. and a time of 1 second to 100 hours.

4. A process for producing a food having excellent preservability, comprising the step of heating a food while adding a food preservative comprising:
(a) one or both of 1,5-D-anhydrofructose and 1,5-D-anhydrofructose previously subjected to a heat treatment, and
(b) a substance capable of being used as a food additive and having an antibacterial activity to a food, or the steps of adding said food preservative to a food and then heating the food, wherein the proportion of the component (a) in the food preservative is 0.01 to 10% by weight based on the food and the heating is carried out at a temperature of 50 to 250° C. and for a time of 1 second to 300 minutes.

5. The process according to claim 4, wherein heating conditions for the 1,5-D-anhydrofructose previously subjected to the heat treatment are a temperature of 50 to 150° C. and a time of 1 second to 100 hours.

6. The process according to claim 4, wherein the substance capable of being used as a food additive and having an antibacterial activity is selected from the group consisting of amino acids; glycerin lower fatty acid esters; sugar esters; salts of vitamin B1; polyphosphates; ethanol; basic proteins and peptides; antibacterial extract from licorice; extract from red pepper; extract from hop; extract from yucca; extract from moso bamboo (thick-stemmed bamboo); extract from grape fruit seed; extract from wasabi (Japanese horseradish) or mustard; acetic acid, lactic acid, fumaric acid and the salts thereof; sorbic acid, benzoic acid and the salts and esters thereof; propionic acid and the salt thereof; chitosan and bacterium DNA.

7. A method for preserving a food having excellent preservability, comprising the step of heating a food while adding a food preservative comprising:
(a) one or both of 1,5-D-anhydrofructose and 1,5-D-anhydrofructose previously subjected to a heat treatment, and
(b) a substance capable of being used as a food additive and having an antibacterial activity to a food, or the steps of adding said food preservative to a food and then heating the food, and preserving the resulting food, wherein the proportion of the component (a) in the food preservative is 0.01 to 10% by weight based on the food and the heating is carried out at a temperature of 50 to 250° C. and for a time of 1 second to 300 minutes.

* * * * *